Patented Feb. 20, 1951

2,542,010

UNITED STATES PATENT OFFICE 2,542,010

PROCESSES FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application May 6, 1949,
Serial No. 91,884

9 Claims. (Cl. 252—345)

This invention relates to processes or procedures particularly adapted for preventing, breaking, or resolving emulsions of the water-in-oil type, and particularly petroleum emulsions. We have found that if certain hydrophile hydroxylated synthetic products are treated with one or more moles of epichlorohydrin the resultant product is particularly effective as a demulsifier, and also has other utilities in other arts, as, for example, serving as an intermediate for the manufacture of more complex organic compounds.

In the process of demulsification we are inclined to suspect that there is a slight amount of hydrolysis at the interface after the demulsifying agent has been absorbed, and, thus, hydrochloric acid is generated in minute amounts which appear to effect the stability of the emulsion, or, stated conversely, increases the effectiveness of the demulsifier.

The hydrophile hydroxylated synthetic products employed as initial materials for reaction with epichlorhydrin, have been described in a number of our co-pending applications, for example, Serial No. 8,722 (now Patent No. 2,499,365), Serial No. 8,723 (now Patent No. 2,499,366), and Serial No. 8,730 (now abandoned), all filed February 16, 1948, and Serial No. 42,133, filed August 2, 1948 (now abandoned). See also our co-pending applications, Serial Nos. 64,468 (now abandoned), and 64,469, both filed December 8, 1948.

Complementary to the above aspect of our invention is our companion invention concerned with the new chemical products or compounds used as the demulsifying agents in said aforementioned processes or procedures, as well as the application of such chemical compounds, products, and the like in various other arts and industries, along with the method for manufacturing said new chemical products or compounds which are of outstanding value in demulsification. See our co-pending application Serial No. 91,885, filed May 6, 1949.

Our invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component.

Thus, the present invention is concerned with breaking petroleum emulsions of the water-in-oil type, characterized by subjecting the emulsion to the action of a chloro-oxypropylated derivative of hydrophile hydroxylated synthetic products; said hydrophile synthetic products being oxyalkylation products of (A) An alpha-beta alkylene oxide having not more than 4 carbon atoms and selected from the class consisting of ethylene oxide, propylene oxide, butylene oxide, glycide, and methylglycide; and (B) An oxyalkylation-susceptible, fusible, organic solvent-soluble, water-insoluble, phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

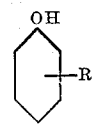

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; said chloro-oxypropylated compounds being obtained by reaction with epichlorohydrin; and with the final proviso that the hydrophile properties of the chloro-oxypropylated derivative as well as the oxyalkylated resin in an equal weight of xylene are sufficient to produce an emulsion when said xylene solution is shaken vigorously with one to three volumes of water.

For purpose of convenience, what is said hereinafter will be divided into four parts. Part 1 will be concerned with the production of the resin from a difunctional phenol and an aldehyde; Part 2 will be concerned with the oxyalkylation of the resin so as to convert it into a hydrophile hydroxylated derivative; Part 3 will be concerned with the conversion of the immediately aforementioned compound, or the like, into a chloro-oxypropylated derivative by means of epichlorohydrin; and Part 4 will be concerned with the use of such derivatives, obtained by means of epichlorohydrin, as demulsifiers, as hereinafter described.

PART 1

As to the preparation of the phenol-aldehyde resins, reference is made to our co-pending applications Serial Nos. 8,730 and 8,731, both filed February 16, 1943 (both now abandoned). In such co-pending applications we described a fusible, organic solvent-soluble, water-insoluble resin polymer of the formula:

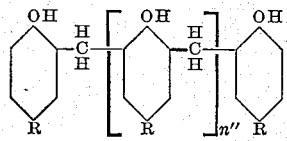

In such idealized representation $n''$ is a numeral varying from 1 to 13, or even more, provided that the resin is fusible and organic solvent-soluble. R is a hydrocarbon radical having at least 4 and not over 8 carbon atoms. In the instant application R may have as many as 12 carbon atoms, as in the case of a resin obtained from a dodecylphenol. In the instant invention it may be first suitable to describe the alkylene oxides employed as reactants, then the aldehydes, and finally, the phenols, for the reason that the latter require a more elaborate description.

The alkylene oxides which may be used are the alpha-beta oxides having not more than 4 carbon atoms, to wit, ethylene oxide, alpha-beta propylene oxide, alpha-beta butylene oxide, glycide, and methylglycide.

Any aldehyde capable of forming a methylol or a substituted methylol group and having not more than 8 carbon atoms is satisfactory, so long as it does not possess some other functional group or structure which will conflict with the resinification reaction, or with the subsequent oxyalkylation of the resin, but the use of formaldehyde, in its cheapest form of an aqueous solution, for the production of the resins is particularly advantageous. Solid polymers of formaldehyde are more expensive and higher aldehydes are both less reactive, and are more expensive. Furthermore, the higher aldehydes may undergo other reactions which are not desirable, thus introducing difficulties into the resinification step. Thus, acetaldehyde, for example, may undergo an aldol condensation, and it and most of the higher aldehydes enter into self-resinification when treated with strong acids or alkalies. On the other hand, higher aldehydes frequently beneficially affect the solubility and fusibility of a resin. This is illustrated, for example, by the different characteristics of the resin prepared from para-tertiary amylphenol and formaldehyde on one hand, and a comparable product prepared from the same phenolic reactant and heptaldehyde on the other hand. The former, as shown in certain subsequent examples, is a hard, brittle, solid, whereas, the latter is soft and tacky, and obviously easier to handle in the subsequent oxyalkylation procedure.

Cyclic aldehydes may be employed, particularly benzaldehyde. The employment of furfural requires careful control, for the reason that in addition to its aldehydic function, furfural can form vinyl condensations by virtue of its unsaturated structure. The production of resins from furfural for use in preparing reactants for the present process is most conveniently conducted with weak alkaline catalysts and often with alkali metal carbonates. Useful aldehydes, in addition to formaldehyde, are acetaldehyde, propionic aldehyde, butyraldehyde, 2-ethylhexanal, ethylbutyraldehyde, heptaldehyde, and benzaldehyde, furfural and glyoxal. It would appear that the use of glyoxal should be avoided, due to the fact that it is tetrafunctional. However, our experience has been that, in resin manufacture and particularly as described herein, apparently only one of the aldehydic functions enters into the resinification reaction. The inability of the other aldehydic function to enter into the reaction is presumably due to steric hindrance. Needless to say, one can use a mixture of two or more aldehydes, although usually this has no advantage.

Resins of the kind which are used as intermediates in this invention are obtained with the use of acid catalysts or alkaline catalysts, or without the use of any catalyst at all. Among the useful alkaline catalysts are ammonia, amines, and quaternary ammonium bases. It is generally accepted that when ammonia and amines are employed as catalysts, they enter into the condensation reaction, and in fact, may operate by initial combination with the aldehydic reactant. The compound hexamethylenetetramine illustrates such a combination. In light of these various reactions, it becomes difficult to present any formula which would depict the structure of the various resins prior to oxyalkylation. More will be said subsequently as to the difference between the use of an alkaline catalyst and an acid catalyst; even in the use of an alkaline catalyst, there is considerable evidence to indicate that the products are not identical where different basic materials are employed. The basic materials employed include not only those previously enumerated, but also the hydroxides of the alkali metals, hydroxides of the alkaline earth metals, salts of strong bases and weak acids, such as sodium acetate, etc.

Suitable phenolic reactants include the following: Para-tertiary-butylphenol; para-secondary-butylphenol; para-tertiaryamylphenol; para-secondary-amylphenol; para-tertiaryhexylphenol; para-isooctylphenol; ortho-phenylphenol; para-phenylphenol; ortho-benzylphenol; para-benzylphenol; and para-cyclohexylphenol, and the corresponding ortho-para-substituted metacresols and 3,5-xylenols. Similarly, one may use para- or ortho-nonylphenol or a mixture, para- or ortho-decylphenol or a mixture, menthylphenol, or para or ortho-dodecylphenol.

For convenience, the phenol has previously been referred to as monocyclic, in order to differentiate from fused nucleus polycyclic phenols, such as substituted naphthols. Specifically, "monocyclic" is limited to the nucleus in which the hydroxyl radical is attached. Broadly speaking, where a substituent is cyclic, particularly aryl, obviously in the usual sense such phenol is actually polycyclic, although the phenolic hydroxyl is not attached to a fused polycyclic nucleus. Stated another way, phenols in which the hydroxyl group is directly attached to a condensed or fused polycyclic structure, are excluded. This matter, however, is clarified by the following consideration. The phenols herein contemplated for reaction may be indicated by the following formula:

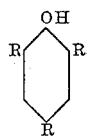

in which R is selected from the class consisting of hydrogen atoms and hydrocarbon radicals having at least 4 carbon atoms and not more than 12 carbon atoms, with the proviso that one occurrence of R is the hydrocarbon substituent and the other two occurrences are hydrogen atoms, and with the further provision that one or both of the 3 and 5 positions may be methyl substituted.

The above formula possibly can be restated more conveniently in the following manner, to wit, that the phenol employed is of the following formula, with the proviso that R is a hydrocarbon substituent located in the 2,4,6 position, again with the provision as to 3 or 3,5 methyl substitution. This is conventional nomenclature, numbering the various positions in the usual clockwise manner, beginning with the hydroxyl position as one:

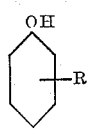

The manufacture of thermoplastic phenol-aldehyde resins, particularly from formaldehyde and a difunctional phenol, i. e., a phenol in which one of the three reactive positions (2,4,6) has been substituted by a hydrocarbon group, and particularly by one having at least 4 carbon atoms and not more than 12 carbon atoms, is well known. As has been previously pointed out, there is no objection to a methyl radical provided it is present in the 3 or 5 position.

Thermoplastic or fusible phenol-aldehyde resins are usually manufactured for the varnish trade and oil solubility is of prime importance. For this reason, the common reactants employed are butylated phenols, amylated phenols, phenylphenols, etc. The methods employed in manufacturing such resins are similar to those employed in the manufacture of ordinary phenol-formaldehyde resins, in that either an acid or alkaline catalyst is usually employed. The procedure usually differs from that employed in the manufacture of ordinary phenol-aldehyde resins in that phenol, being water-soluble, reacts readily with an aqueous aldehyde solution without further difficulty, while when a water-insoluble phenol is employed some modification is usually adopted to increase the interfacial surface and thus cause reaction to take place. A common solvent is sometimes employed. Another procedure employs rather severe agitation to create a large interfacial area. Once the reaction starts to a moderate degree, it is possible that both reactants are somewhat soluble in the partially reacted mass and assist in hastening the reaction. We have found it desirable to employ a small proportion of an organic sulfo-acid as a catalyst, either alone or along with a mineral acid like sulfuric or hydrochloric acid. For example, alkylated aromatic sulfonic acids are effectively employed. Since commercial forms of such acids are commonly their alkali salts, it is sometimes convenient to use a small quantity of such alkali salt plus a small quantity of strong mineral acid, as shown in the examples below. If desired, such organic sulfo-acids may be prepared in situ in the phenol employed, by reacting concentrated sulfuric acid with a small proportion of the phenol. In such cases where xylene is used as a solvent and concentrated sulfuric acid is employed, some sulfonation of the xylene probably occurs to produce the sulfo-acid. Addition of a solvent such as xylene is advantageous as hereinafter described in detail. Another variation of procedure is to employ such organic sulfo-acids, in the form of their salts, in connection with an alkali-catalyzed resinification procedure. Detailed examples are included subsequently.

Another advantage in the manufacture of the thermoplastic or fusible type of resin by the acid catalytic procedure is that, since a difunctional phenol is employed, an excess of an aldehyde, for instance formaldehyde, may be employed without too marked a change in conditions of reaction and ultimate product. There is usually little, if any, advantage, however, in using an excess over and above the stoichiometric proportions for the reason that such excess may be lost and wasted. For all practical purposes the molar ratio of formaldehyde to phenol may be limited to 0.9 to 1.2, with 1.05 as the preferred ratio, or sufficient, at least theoretically, to convert the remaining reactive hydrogen atom of each terminal phenolic nucleus. Sometimes when higher aldehydes are used an excess of aldehydic reactant can be distilled off and thus recovered from the reaction mass. This same procedure may be used with formaldehyde and excess reactant recovered.

When an alkaline catalyst is used the amount of aldehyde, particularly formaldehyde, may be increased over the simple stoichiometric ratio of one-to-one or thereabouts. With the use of alkaline catalyst it has been recognized that considerably increased amounts of formaldehyde may be used, as much as two moles of formaldehyde, for example, per mole of phenol, or even more, with the result that only a small part of such aldehyde remains uncombined or is subsequently liberated during resinification. Structures which have been advanced to explain such increased use of aldehydes are the following:

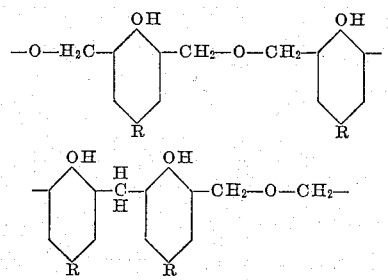

Such structures may lead to the production of cyclic polymers instead of linear polymers. For this reason, it has been previously pointed out that, although linear polymers have by far the most important significance, the present invention does not exclude resins of such cyclic structures.

Sometimes conventional resinification procedure is employed using either acid or alkaline catalysts to produce low-stage resins. Such resins may be employed as such, or may be altered or converted into high-stage resins, or in any event, into resins of higher molecular weight, by heating along with the employment of vacuum so as to split off water or formaldehyde, or both. Generally speaking, temperatures employed, particularly with vacuum, may be in the neighborhood of 175° to 250° C., or thereabouts.

It may be well to point out, however, that the amount of formaldehyde used may and does usually affect the length of the resin chain. Increasing the amount of the aldehyde, such as formaldehyde, usually increases the size or molecular weight of the polymer.

In the hereto appended claims there is specified, among other things, the resin polymer containing at least 3 phenolic nuclei. Such minimum molecular size is most conveniently determined as a rule by cryoscopic method using benzene, or some other suitable solvent, for instance, one of those mentioned elsewhere herein as a solvent for such resins. As a matter of fact, using the procedures herein described or any conventional resinification procedure will yield products usually having definitely in excess of 3 nuclei. In other words, a resin having an average of 4, 5 or 5½ nuclei per unit is apt to be formed as a minimum in resinification, except under certain special conditions where dimerization may occur.

However, if resins are prepared at substantially higher temperatures, substituting cymene, tetralin, etc., or some other suitable solvent which boils or refluxes at a higher temperature, instead of xylene, in subsequent examples, and if one doubles or triples the amount of catalyst, doubles or triples the time of refluxing, uses a marked excess of formaldehyde or other aldehyde, then the average size of the resin is apt to be distinctly over the above values, for example, it may average 7 to 15 units. Sometimes the expression "low-stage" resin or "low-stage" intermediate is employed to mean a stage having 6 or 7 units or even less. In the appended claims we have used "low-stage" to mean 3 to 7 units based on average molecular weight.

The molecular weight determinations, of course, require that the product be completely soluble in the particular solvent selected as, for instance, benzene. The molecular weight determination of such solution may involve either the freezing point as in the cryoscopic method, or, less conveniently perhaps, the boiling point in an ebullioscopic method. The advantage of the ebullioscopic method is that, in comparison with the cryoscopic method, it is more apt to insure complete solubility. One such common method to employ is that of Menzies and Wright (see J. Am. Chem. Soc. 43, 2309 and 2314 (1921)). Any suitable method for determining molecular weights will serve, although almost any procedure adopted has inherent limitations. A good method for determining the molecular weights of resins, especially solvent-soluble resins, is the cryoscopic procedure of Krumbhaar which employs diphenylamine as a solvent (see "Coating and Ink Resins," page 157, Reinhold Publishing Co. 1947).

Subsequent examples will illustrate the use of an acid catalyst, an alkaline catalyst, and no catalyst. As far as resin manufacture per se is concerned, we prefer to use an acid catalyst, and particularly a mixture of an organic sulfo-acid and a mineral acid, along with a suitable solvent, such as xylene, as hereinafter illustrated in detail. However, we have obtained products from resins obtained by use of an alkaline catalyst which were just as satisfactory as those obtained employing acid catalysts. Sometimes a combination of both types of catalysts is used in different stages of resinification. Resins so obtained are also perfectly satisfactory.

In numerous instances the higher molecular weight resins, i. e., those referred to as high-stage resins, are conveniently obtained by subjecting lower molecular weight resins to vacuum distillation and heating. Although such procedure sometimes removes only a modest amount or even perhaps no low polymer, yet it is almost certain to produce further polymerization. For instance, acid catalyzed resins obtained in the usual manner and having a molecular weight indicating the presence of approximately 4 phenolic units or thereabouts may be subjected to such treatment, with the result that one obtains a resin having approximately double this molecular weight. The usual procedure is to use a secondary step, heating the resin in the presence or absence of an inert gas, including steam, or by use of vacuum.

We have found that under the usual conditions of resinification employing phenols of the kind here described, there is little or no tendency to form binuclear compounds, i. e., dimers, resulting from the combination, for example, of 2 moles of a phenol and one mole of formaldehyde, particularly where the substituent has 4 or 5 carbon atoms. Where the number of carbon atoms in a substituent approximates the upper limit specified herein, there may be some tendency to dimerization. The usual procedure to obtain a dimer involves an enormously large excess of the phenol, for instance, 8 to 10 moles per mole of aldehyde. Substituted dihydroxydiphenylmethanes obtained from substituted phenols are not resins as that term is used herein.

A'though any conventional procedure ordinarily employed may be used in the manufacture of the herein contemplated resins or, for that matter, such resins may be purchased in the open market, we have found it particularly desirable to use the procedures described elsewhere herein, and employing a combination of an organic sulfoacid and a mineral acid as a catalyst, and xylene as a solvent. By way of illustration, certain subsequent examples are included, but it is to be understood the herein described invention is not concerned with the resins per se or with any particular method of manufacture but is concerned with the use of reactants obtained by the subsequent oxyalkylation thereof. The phenolaldehyde resins may be prepared in any suitable manner.

Oxyalkylation, particularly oxyethylation which is the preferred reaction, depends on contact between a non-gaseous phase and a gaseous phase. It can, for example, be carried out by melting the thermoplastic resin and subjecting it to treatment with ethylene oxide or the like, or by treating a suitable solution or suspension. Since the melting points of the resin are often higher than desired in the initial stage of oxyethylation, we have found it advantageous to use a solution or suspension of thermoplastic resin in an inert solvent such as xylene. Under such circumstances, the resin obtained in the usual manner is dissolved by heating in xylene under a reflux condenser or in any other suitable manner. Since xylene or an equivalent inert solvent is present or may be present during oxyalkylation, it is obvious there is no objection to having a solvent present during the resinifying stage if, in addition to being inert towards the resin, it is also inert towards the reactants and also inert towards water. Numerous solvents, particularly of aromatic or cyclic nature, are suitably adapted for such use. Examples of such solvents are xylene, cymene, ethyl benzene, propyl benzene, mesitylene, decalin (decahydronaphthalene), tetralin (tetrahydronaphthalene), ethylene glycol diethylether, diethylene glycol diethylether, and tetraethylene glycol dimethylether, or mixtures of one or more. Solvents such as dichloroethylether, or dichloropropylether may be employed either alone or in mixture but have the objection that the chlorine atom in the compound may slowly combine with the alkaline catalyst employed in oxyethylation. Suitable solvents may be selected from this group for molecular weight determinations.

The use of such solvents is a convenient expedient in the manufacture of the thermoplastic resins, particularly since the solvent gives a more liquid reaction mass and thus prevents overheating, and also because the solvent can be employed in connection with a reflux condenser and a water trap to assist in the removal of water of reaction and also water present as part of the formaldehyde reactant when an aqueous solution of formaldehyde is used. Such aqueous solution, of course, with the ordinary product of commerce containing about 37½% to 40% formaldehyde, is the preferred reactant. When such solvent is used it is advantageously added at the beginning of the resinification procedure or before the reaction has proceeded very far.

The solvent can be removed afterwards by distillation with or without the use of vacuum, and a final higher temperature can be employed to complete reaction if desired. In many instances it is most desirable to permit part of the solvent, particularly when it is inexpensive, e. g., xylene, to remain behind in a predetermined amount so as to have a resin which can be handled more conveniently in the oxyalkylation stage. If a more expensive solvent, such as decalin, is employed, xylene or other inexpensive solvent may be added after the removal of decalin, if desired.

In preparing resins from difunctional phenols it is common to employ reactants of technical grade. The substituted phenols herein contemplated are usually derived from hydroxybenzene. As a rule, such substituted phenols are comparatively free from unsubstituted phenol. We have generally found that the amount present is considerably less than 1% and not infrequently in the neighborhood of $\frac{1}{10}$ of 1%, or even less. The amount of the usual trifunctional phenol, such as hydroxybenzene or metacresol, which can be tolerated is determined by the fact that actual cross-linking, if it takes place even infrequently, must not be sufficient to cause insolubility at the completion of the resinification stage or the lack of hydrophile properties at the completion of the oxyalkylation stage.

The exclusion of such trifunctional phenols as hydroxybenzene or metacresol is not based on the fact that the mere random or occasional inclusion of an unsubstituted phenyl nucleus in the resin molecule or in one of several molecules, for example, markedly alters the characteristics of the oxyalkylated derivative. The presence of a phenyl radical having a reactive hydrogen atom available or having a hydroxymethylol or a substituted hydroxymethylol group present is a potential source of cross-linking either during resinification or oxyalkylation. Cross-linking leads either to insoluble resins or to non-hydrophilic products resulting from the oxyalkylation procedure. With this rationale understood, it is obvious that trifunctional phenols are tolerable only in a minor proportion and should not be present to the extent that insolubility is produced in the resins, or that the product resulting from oxyalkylation is gelatinous rubbery, or at least not hydrophile. As to the rationale of resinification, note particularly what is said hereafter in differentiating between resoles, Novolaks, and resins obtained solely from difunctional phenols.

Previous reference has been made to the fact that fusible organic solvent-soluble resins are usually linear but may be cyclic. Such more complicated structure may be formed, particularly if a resin prepared in the usual manner is converted into a higher stage resin by heat treatment in vacuum as previously mentioned. This again is a reason for avoiding any opportunity for cross-linking due to the presence of any appreciable amount of trifunctional phenol. In other words, the presence of such reactant may cause cross-linking in a conventional resinification procedure, or in the oxyalkylation procedure, or in the heat and vacuum treatment if it is employed as part of resin manufacture.

Our routine procedure in examining a phenol for suitability for preparing intermediates to be used in practicing the invention is to prepare a resin employing formaldehyde in excess (1.2 moles of formaldehyde per mole of phenol) and using an acid catalyst in the manner described in Example 1a of our Patent 2,499,370, granted March 7, 1950. If the resin so obtained is solvent-soluble in any one of the aromatic or other solvents previously referred to, it is then subjected to oxyethylation. During oxyethylation a temperature is employed of approximately 150° to 165° C. with addition of at least 2 and advantageously up to 5 moles of ethylene oxide per phenolic hydroxyl. The oxyethylation is advantageously conducted so as to require from a few minutes up to 5 to 10 hours. If the product so obtained is solvent-soluble and self-dispersing or emulsifiable, or has emulsifying properties, the phenol is perfectly satisfactory from the standpoint of trifunctional phenol content. The solvent may be removed prior to the dispersibility or emulsifiability test. When a product becomes rubbery during oxyalkylation due to the presence of a small amount of trireactive phenol, as previously mentioned, or for some other reason, it may become extremely insoluble, and no longer qualifies as being hydrophile as herein specified. Increasing the size of the aldehydic nucleus, for instance using heptaldehyde instead of formaldehyde, increases tolerance for trifunctional phenol.

The presence of a trifunctional or tetrafunctional phenol (such as resorcinol or bisphenol A) is apt to produce detectable cross-linking and insolubilization but will not necessarily do so, especially if the proportion is small. Resinification involving difunctional phenols only may also produce insolubilization, authough this seems to be an anomaly or a contradiction of what is sometimes said in regard to resinification reactions involving difunctional phenols only. This is presumably due to cross-linking. This appears to be contradictory to what one might expect in light of the theory of functionality in resinification. It is true that under ordinary circumstances, or rather under the circumstances of conventional resin manufacture, the procedures employing difunctional phenols are very apt to, and almost invariably do, yield solvent-soluble, fusible resins. However, when conventional procedures are employed in connection with resins for varnish manufacture or the like, there is involved the matter of color, solubility in oil, etc. When resins of the same type are manufactured for the herein contemplated purpose, i. e., as a raw material to be subjected to oxyalkylation, such criteria of selection are no longer pertinent. Stated another way, one may use more drastic conditions of resinification than those ordinarily employed to produce resins for the present purposes. Such more drastic conditions of resinification may include increased amounts of catalyst, higher temperatures, longer time of reaction, subsequent reaction involving heat alone or in combination with vacuum, etc. Therefore, one is not only concerned with the resinification reactions which yield the bulk of ordinary resins from difunctional phenols but also and particularly with the minor reactions of ordinary resin manufacture which are of importance in the present invention for the reason that they occur under more drastic conditions of resinification which may be employed advantageously at times, and they may lead to cross-linking.

In this connection it may be well to point out that part of these reactions are now understood or explainable to a greater or lesser degree in light of a most recent investigation. Reference is made to the researches of Zinke and his co-workers, Hultzsch and his associates, and to von Eulen and his co-workers, and others. As to a bibliography of such investigations, see Carswell, "Phenoplasts," chapter 2. These investigators limited much of their work to reactions involving phenols having two or less reactive hydrogen atoms. Much of what appears in these most recent and most up-to-date investigations is pertinent to the present invention insofar that much of it is referring to resinification involving difunctional phenols.

For the moment, it may be simpler to consider a "most typical type" of fusible resin and forget for the time that such resin, at least under certain circumstances, is susceptible to further complications. Subsequently in the text it will be pointed out that cross-linking or reaction with excess formaldehyde may take place even with one of such "most typical type" resins. This point is made for the reason that insolubles must be avoided in order to obtain the products herein contemplated for use as reactants.

The "typical type" of fusible resin obtained from a para-blocked or ortho-blocked phenol is clearly differentiated from the Novolak type or resole type of resin. Unlike the resole type, such "typical type" para-blocked or ortho-blocked phenol resin may be heated indefinitely without passing into an infusible stage, and in this respect is similar to a Novolak. Unlike the Novolak type the addition of a further reactant, for instance, more aldehyde, does not ordinarily alter fusibility of the difunctional phenol-aldehyde type resin; but such addition to a Novolak causes cross-linking by virtue of the available third functional position.

What has been said immediately preceding is subject to modification in this respect: It is well known, for example, that difunctional phenols, for instance, paratertiaryamylphenol, and an aldehyde, particularly formaldehyde, may yield heat-hardenable resins, at least under certain conditions, as for example the use of two moles of formaldehyde to one of phenol, along with an alkaline catalyst. This peculiar hardening or curing or cross-linking of resins obtained from difunctional phenols has been recognized by various authorities.

The intermediates herein used must be hydrophile or sub-surface-active or surface-active as hereinafter described, and this precludes the formation of insolubles during resin manufacture or the subsequent stage of resin manufacture where heat alone, or heat and vacuum, are employed, or in the oxyalkylation procedure. In its simplest presentation the rationale of resinification involving formaldehyde, for example, and a difunctional phenol would not be expected to form crosslinks. However, cross-linking sometimes occurs and it may reach the objectionable stage. However, provided that the preparation of resins simply takes into cognizance the present knowledge of the subject, and employing preliminary, exploratory routine examinations as herein indicated, there is not the slightest difficulty in preparing a very large number of resins of various types and from various reactants, and by means of different catalysts by different procedures, all of which are eminently suitable for the herein described purpose.

Now returning to the thought that cross-linking can take place, even when difunctional phenols are used exclusively, attention is directed to the following: Somewhere during the course of resin manufacture there may be a potential cross-linking combination formed but actual cross-linking may not take place until the subsequent stage is reached, i. e., heat and vacuum stage, or oxyalkylation stage. This situation may be related or explained in terms of a theory of flaws, or Lockerstellen, which is employed in explaining flaw-forming groups due to the fact that a CH₂OH radical and H atom may not lie in the same plane in the manufacture of ordinary phenol-aldehyde resins.

Secondly, the formation or absence of formation of insolubles may be related to the aldehyde used and the ratio of aldehyde, particularly formaldehyde, insofar that a slight variation may, under circumstances not understandable, produce insolubilization. The formation of the insoluble resin is apparently very sensitive to the quantity of formaldehyde employed and a slight increase in the proportion of formaldehyde may lead to the formation of insoluble gel lumps. The cause of insoluble resin formation is not clear, and nothing is known as to the structure of these resins.

All that has been said previously herein as regards resinification has avoided the specific reference to activity of a methylene hydrogen atom. Actually there is a possibility that under some drastic conditions cross-linking may take place through formaldehyde addition to the methylene bridge, or some other reaction involving a methylene hydrogen atom.

Finally, there is some evidence that, although the meta positions are not ordinarily reactive, possibly at times methylol groups or the like are formed at the meta positions; and if this were the case it may be a suitable explanation of abnormal cross-linking.

Reactivity of a resin towards excess aldehyde, for instance formaldehyde, is not to be taken as a criterion of rejection for use as a reactant. In other words, a phenol-aldehyde resin which is thermoplastic and solvent-soluble, particularly if xylene-soluble, is perfectly satisfactory even though retreatment with more aldehyde may change its characteristics markedly in regard to both fusibility and solubility. Stated another way, as far as resins obtained from difunctional phenols are concerned, they may be either formaldehyde-resistant or not formaldehyde-resistant.

Referring again to the resins herein contemplated as reactants, it is to be noted that they are thermoplastic phenol-aldehyde resins derived from difunctoinal phenols and are clearly distinguished from Novolaks or resoles. When these resins are produced from difunctional phenols and some of the higher aliphatic aldehydes, such as acetaldehyde, the resultant is often a comparatively soft or pitchlike resin at ordinary temperature. Such resins become comparatively fluid at 110° to 165° C. as a rule and thus can be readily oxyalkylated, preferably oxyethylated, without the use of a solvent.

Reference has been made to the use of the word "fusible." Ordinarily a thermoplastic resin is identified as one which can be heated repeatedly and still not lose its thermoplasticity. It is recognized, however, that one may have a resin which is initially thermoplastic but on repeated heating may become insoluble in an organic solvent, or at least no longer thermoplastic, due to the fact that certain changes take place very slowly. As far as the present invention is concerned, it is obvious that a resin to be suitable need only be sufficiently fusible to permit processing to produce our oxyalkylated products and not yield insolubles or cause insolubilization or gel formation, or rubberiness, as previously described. Thus resins which are, strictly speaking, fusible but not necessarily thermoplastic in the most rigid sense that such terminology would be appleid to the mechanical properties of a resin, are useful intermediates. The bulk of all fusible resins of the kind herein described are thermoplastic.

The fusible or thermoplastic resins, or solvent-soluble resins, herein employed as reactants, are water-insoluble, or have no appreciable hydrophile properties. The hydrophile property is introduced by oxyalkylation. In the hereto appended claims and elsewhere the expression "water-insoluble" is used to point out this characteristic of the resins used.

In the manufacture of compounds herein employed, particularly for demulsification, it is obvious that the resins can be obtained by one of a number of procedures. In the first place, suitable resins are marketed by a number of companies and can be purchased in the open market; in the second place, there are a wealth of examples of suitable resins described in the literature. The third procedure is to follow the directions of the present application.

The polyhydric reactants, i. e., the oxyalkylation-susceptible, water-insoluble, organic solvent-soluble, fusible, phenol-aldehyde resins derived from difunctional phenols, used as intermediates to produce the products used in accordance with the invention, are exemplified by Examples Nos. 1a through 103a of our Patent 2,499,370, granted March 7, 1950, and reference is made to that patent for examples of the oxyalkylated resins used as intermediates.

Previous reference has been made to the use of a single phenol as herein specified, or a single reactive aldehyde, or a single oxyalkylating agent. Obviously, mixtures of reactants may be employed, as for example a mixture of para-butylphenol and para-amylphenol, or a mixture of para-butylphenol and para-hexylphenol, or para-butylphenol and para-phenylphenol. It is extremely difficult to depict the structure of a resin derived from a single phenol. When mixtures of phenols are used, even in equimolar proportions, the structure of the resin is even more indeterminable. In other words, a mixture involving para-butylphenol and para-amylphenol might have an alternation of the two nuclei or one might have a series of butylated nuclei and then a series of amylated nuclei. If a mixture of aldehydes is employed, for instance, acetaldehyde and butyraldehyde, or acetaldehyde and formaldehyde, or benzaldehyde and acetaldehyde, the final structure of the resin becomes even more complicated and possibly depends on the relative reactivity of the aldehydes. For that matter, one might be producing simultaneously two different resins, in what would actually be a mechanical mixture, although such mixture might exhibit some unique properties as compared with a mixture of the same two resins prepared separately. Similarly, as has been suggested, one might use a combination of oxyalkylating agents; for instance, one might partially oxyalkylate with ethylene oxide and then finish off with propylene oxide. It is understood that the oxyalkylated derivatives of such resins, derived from such plurality of reactants, instead of being limited to a single reactant from each of the three classes, is contemplated and here included for the reason that they are obvious variants.

PART 2

Having obtained a suitable resin of the kind described, such resin is subjected to treatment with a low molal reactive alpha-beta olefine oxide so as to render the product distinctly hydrophile in nature, as indicated by the fact that it becomes self-emulsifiable or miscible or soluble in water, or self-dispersible, or has emulsifying properties. The olefine oxides employed are characterized by the fact that they contain not over 4 carbon atoms and are selected from the class consisting of ethylene oxide, propylene oxide, butylene oxide, glycide, and methylglycide. Glycide may be, of course, considered as a hydroxypropylene oxide and methyl glycide as a hydroxy butylene oxide. In any event, however, all such reactants contain the reactive ethylene oxide ring and may be best considered as derivatives of or substituted ethylene oxides. The solubilizing effect of the oxide is directly proportional to the percentage of oxygen present, or specifically, to the oxygen-carbon ratio.

In ethylene oxide, the oxygen-carbon ratio is 1:2. In glycide, it is 2:3; and in methyl glycide, 1:2. In such compounds, the ratio is very favorable to the production of hydrophile or surface-active properties. However, the ratio, in propylene oxide, is 1:3, and in butylene oxide, 1:4. Obviously, such latter two reactants are satisfactorily employed only where the resin composition is such as to make incorporation of the desired property practical. In other cases, they may produce marginally satisfactory derivatives, or even unsatisfactory derivatives. They are usable in conjunction wtih the three more favorable alkylene oxides in all cases. For instance, after one or several propylene oxide or butylene oxide molecules have been attached to the resin molecule, oxyalkylation may be satisfactorily continued using the more favorable members of the class, to produce the desired hydrophile product. Used alone, these two reagents may in some cases fail to produce sufficiently hydrophile derivatives because of their relatively low oxygen-carbon ratios.

Thus, ethylene oxide is much more effective than propylene oxide, and propylene oxide is more effective than butylene oxide. Hydroxy propylene oxide (glycide) is more effective than propylene oxide. Similarly, hydroxy butylene oxide (methyl glycide) is more effective than butylene oxide. Since ethylene oxide is the cheapest alkylene oxide available and is reactive, its use is definitely advantageous, and especially in light of its high oxygen content. Propylene oxide is less reactive than ethylene oxide, and butylene oxide is definitely less reactive than propylene oxide. On the other hand, glycide may react with almost explosive violence and must be handled with extreme care.

The oxyalkylation of resins of the kind from which the initial reactants used in the practice of the present invention are prepared is advantageously catalyzed by the presence of an alkali. Useful alkaline catalysts include soaps, sodium acetate, sodium hydroxide, sodium methylate, caustic potash, etc. The amount of alkaline catalyst usually is between 0.2% to 2%. The temperature employed may vary from room temperature to as high as 200° C. The reaction may be conducted with or without pressure, i. e., from zero pressure to approximately 200 or even 300 pounds gauge pressure (pounds per square inch). In a general way, the method employed is substantially the same procedure as used for oxyalkylation of other organic materials having reactive phenolic groups.

It may be necessary to allow for the acidity of a resin in determining the amount of alkaline catalyst to be added in oxyalkylation. For instance, if a nonvolatile strong acid such as sulfuric acid is used to catalyze the resinification reaction, presumably after being converted into a sulfonic acid, it may be necessary and is usually advantageous to add an amount of alkali equal stoichiometrically to such acidity, and include added alkali over and above this mount as the alkaline catalyst.

It is advantageous to conduct the oxyethylation in presence of an inert solvent such as xylene, cymene, decalin, ethylene glycol diethylether, diethyleneglycol diethylether, or the like, although with many resins, the oxyalkylation proceeds satisfactorily without a solvent. Since xylene is cheap and may be permitted to be present in the final product used as a demulsifier, it is our preference to use xylene. This is particularly true in the manufacture of products from low-stage resins, i. e., of 3 and up to and including 7 units per molecule.

If a xylene solution is used in an autoclave as hereinafter indicated, the pressure readings of course represent total pressure, that is, the combined pressure due to xylene and also due to ethylene oxide or whatever other oxyalkylating agent is used. Under such circumstances it may be necessary at times to use substantial pressures to obtain effective results, for instance, pressures up to 300 pounds along with correspondingly high temperatures, if required.

However, even in the instance of high-melting resins, a solvent such as xylene can be eliminated in either one of two ways: After the introduction of approximately 2 or 3 moles of ethylene oxide, for example, per phenolic nucleus, there is a definite drop in the hardness and melting point of the resin. At this stage, if xylene or a similar solvent has been added, it can be eliminated by distillation (vacuum distillation if desired) and the subsequent intermediate, being comparatively soft and solvent-free, can be reacted further in the usual manner with ethylene oxide or some other suitable reactant.

Another procedure is to continue the reaction to completion with such solvent present and then eliminate the solvent by distillation in the customary manner.

Another suitable procedure is to use propylene oxide or butylene oxide as a solvent as well as a reactant in the earlier stages along with ethylene oxide, for instance, by dissolving the powdered resin in propylene oxide, even though oxyalkylation is taking place to a greater or lesser degree. After a solution has been obtained which represents the original resin dissolved in propylene oxide or butylene oxide, or a mixture which includes the oxyalkylated product, ethylene oxide is added to react with the liquid mass until hydrophile properties are obtained. Since ethylene oxide is more reactive than propylene oxide or butylene oxide, the final product may contain some unreacted propylene oxide or butylene oxide which can be eliminated by volatilization or distillation in any suitable manner.

Attention is directed to the fact that the resins herein described must be fusible or soluble in an organic solvent. Fusible resins invariably are soluble in one or more organic solvents such as those mentioned elsewhere herein. It is to be emphasized, however, that the organic solvent employed to indicate or assure that the resin meets this requirement need not be the one used in oxyalkylation. Indeed, solvents which are susceptible to oxyalkylation are included in this group of organic solvents. Examples of such solvents are alcohols and alcohol-ethers. However, where a resin is soluble in an organic solvent, there are usually available other organic solvents which are not susceptible to oxyalkylation, useful for the oxyalkylation step. In any event, the organic solvent-soluble resin can be finely powdered, for instance, to 100 to 200 mesh, and a slurry or suspension prepared in xylene or the like, and subjected to oxyalkylation. The fact that the resin is soluble in an organic solvent or the fact that it is fusible, means that it consists of separate molecules. Phenol-aldehyde resins of the type herein specified possess reactive hydroxyl groups and are oxyalkylation-susceptible.

Considerable of what is said immediately hereinafter is concerned with ability to vary the hydrophile properties of the hydroxylated intermediate reactants from minimum hydrophile properties to maximum hydrophile properties. Such properties, in turn, of course, are effected subsequently by the epichlorhydrin employed for chlorooxypropylation and the quantitative extent of the chloro-oxypropylation. It may be well, however, to point out what has been said elsewhere in regard to the hydroxylated intermediate reactants. See, for example, our copending applications Serial Nos. 8,730 and 8,731, both filed February 16, 1948, and Serial No. 42,133, filed August 2, 1948, and Serial No. 42,134, filed August 2, 1948 (all four cases now abandoned). The reason is that the chloro-oxypropylation may vary the hydrophile-hydrophobe balance in one direction or the other, and also invariably causes the development of some property which makes it inherently different from the two reactants from which the derivative is obtained.

Referring to the hydrophile hydroxylated intermediates, even more remarkable and equally difficult to explain, are the versatility and the utility of these compounds considered as chemical reactants as one goes from minimum hydrophile property to ultimate maximum hydrophile property. For instance, minimum hydrophile property may be described roughly as the point where two ethyleneoxy radicals or moderately in excess thereof are introduced per phenolic hydroxyl. Such minimum hydrophile property or sub-surface-activity or minimum surface-activity means that the product shows at least emulsifying properties or self-dispersion in cold or even in warm distilled water (15° to 40° C.) in concentrations of 0.5% to 5.0%. These materials are generally more soluble in cold water than warm water, and may even be very insoluble in boiling water. Moderately high temperatures aid in reducing the viscosity of the solute under examination. Sometimes if one continues to shake a hot solution, even though cloudy or containing an insoluble phase, one finds that solution takes place to give a homogeneous phase as the mixture cools. Such self-dispersion tests are conducted in the absence of an insoluble solvent.

When the hydrophile-hydrophobe balance is above the indicated minimum (2 moles of ethylene oxide per phenolic nucleus or the equivalent) but insufficient to give a sol as described immediately preceding, then, and in that event hydrophile properties are indicated by the fact that one can produce an emulsion by having present 10% to 50% of an inert solvent such as xylene. All that one need to do is to have a xylene solution within the range of 50 to 90 parts by weight of oxyalkylated derivatives and 50 to 10 parts by weight of xylene and mix such solution with one, two or three times its volume of distilled water and shake vigorously so as to obtain an emulsion which may be of the oil-in-water type or the water-in-oil type (usually the former) but, in any event, is due to the hydrophile-hydrophobe balance of the oxyalkylated derivative. We prefer simply to use the xylene diluted derivatives, which are described elsewhere, for this test rather than evaporate the solvent and employ any more elaborate tests, if the solubility is not sufficient to permit the simple sol test in water previously noted.

If the product is not readily water soluble it may be dissolved in ethyl or methyl alcohol, ethylene glycol diethylether, or diethylene glycol diethylether, with a little acetone added if required, making a rather concentrated solution, for instance 40% to 50%, and then adding enough of the concentrated alcoholic or equivalent solution to give the previously suggested 0.5% to 5.0% strengh solution. If the product is self-dispersing (i. e., if the oxyalkylated product is a liquid or a liquid solution self-emulsifiable); such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principle involved in the manufacture of the herein contemplated compounds for use as polyhydric reactants, is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated resins give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner but one may employ an emulsification test. Emulsions come into existence as a rule through the presence of a surface-active emulsifying agent. Some surface-active emulsifying agents such as mahogany soap may produce a water-in-oil emulsion or an oil-in-water emulsion depending upon the ratio of the two phases, degree of agitation, concentration of emulsifying agent, etc.

The same is true in regard to the oxyalkylated resins herein specified, particularly in the lower stage of oxyalkylation, the so-called "sub-surface-active" stage. The surface-active properties are readily demonstrated by producing a xylene-water emulsion. A suitable procedure is as follows: The oxyalkylated resin is dissolved in an equal weight of xylene. Such 50-50 solution is then mixed with 1-3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In a few instances, the resin may not be sufficiently soluble in xylene alone but may require the addition of some ethylene glycol diethylether as described elsewhere. It is understood that such mixture, or any other similar mixture, is considered the equivalent of xylene for the purpose of this test.

In many cases, there is no doubt as to the presence or absence of hydrophile or surface-active characteristics in the polyhydric reactants used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed, as long as it is at least 2 moles per phenolic nucleus, for producing products useful for the practice of this invention. Another variation is the molecular size of the resin chain resulting from reaction between the difunctional phenol and the aldehyde such as formaldehyde. It is well known that the size and nature or structure of the resin polymer obtained varies somewhat with the conditions of reaction, the proportions of reactants, the nature of the catalyst, etc.

Based on molecular weight determinations, most of the resins prepared as herein described, particularly in the absence of a secondary heating step contain 3 to 6 or 7 phenolic nuclei with approximately 4½ or 5½ nuclei as an average. More drastic conditions of resinification yield resins of greater chain length. Such more intensive resinification is a conventional procedure and may be employed if desired. Molecular weight, of course, is measured by any suitable procedure, particularly by cryoscopic methods; but using the same reactants and using more drastic conditions of resinification one usually finds that higher molecular weights are indicated by higher melting points of the resins and a tendency to decreased solubility. See what has been said elsewhere herein in regard to a secondary step involving the heating of a resin with or without the use of vacuum.

We have previously pointed out that either an alkaline or acid catalyst is advantageously used in preparing the resin. A combination of catalysts is sometimes used in two stages; for instance, an alkaline catalyst is sometimes employed in a first stage, followed by neutralization and addition of a small amount of acid catalyst in a second stage. It is generally believed that even in the presence of an alkaline catalyst, the number of moles of aldehyde, such as formaldehyde, must be greater than the moles of phenol employed in order to introduce methylol groups in the intermediate stage. There is no indication that such groups appear in the final resin if prepared by the use of an acid catalyst. It is possible that such groups may appear in the finished resins prepared solely with an alkaline catalyst; but we have never been able to confirm this fact in an examination of a large number of resins prepared by ourselves. Our preference, however, is to use an acid-catalyzed resin, particularly employing a formaldehyde-to-phenol ratio of 0.95 to 1.20 and, as far as we have been able to determine, such resins are free from methylol groups. As a matter of fact, it is probable that in acid-catalyzed resinifications, the methylol structure may appear only momentarily at the very beginning of the reaction and in all probability is converted at once into a more complex structure during the intermediate stage.

One procedure which can be employed in the use of a new resin to prepare polyhydric reactants for use in the preparation of compounds employed in the present invention, is to determine the hydroxyl value by the Verley-Bölsing method or its equivalent. The resin as such, or in the form of a solution, as described, is then treated with ethylene oxide in presence of 0.5% to 2% of sodium methylate as a catalyst in step-wise fashion. The conditions of reaction, as far as time or percent are concerned, are within the range previously indicated. With suitable agitation the ethylene oxide, if added in molecular proportion, combines within a comparatively short time, for instance, a few minutes to 2 to 6 hours; but in some instances, requires as much as 8 to 24 hours. A useful temperature range is from 125° to 225° C. The completion of the reaction of each addition of ethylene oxide in step-wise fashion is usually indicated by the reduction or elimination of pressure. An amount conveniently used for each addition is generally equivalent to a mole or two moles of ethylene oxide per hydroxyl radical. When the amount of ethylene oxide added is equivalent to approximately 50% by weight of the original resin, a sample is tested for incipient hydrophile properties by simply shaking up in water as is, or after the elimination of the solvent if a solvent is present. The amount of ethylene oxide used to obtain a useful demulsifying agent as a rule varies from 70% by weight of the original resin to as much as five or six times the weight of the original resin. In the case of a resin derived from para-tertiary butylphenol, as little as 50% by weight of ethylene oxide may give suitable solubility. With propylene oxide even a greater molecular proportion is required and sometimes a resultant of only limited hydrophile properties is obtainable. The same is true to even a greater extent with butylene oxide. The hydroxylated alkylene oxides are more effective in solubilizing properties than the comparable compounds in which no hydroxyl is present.

Attention is directed to the fact that in the subsequent examples reference is made to the step-wise addition of the alkylene oxide, such as ethylene oxide. It is understood, of course, there is no objection to the continuous addition of alkylene oxide until the desired stage of reaction is reached. In fact, there may be less of a hazard involved and it is often advantageous to add the alkylene oxide slowly in a continuous stream and in such amount as to avoid exceeding the higher pressures noted in the various examples or elsewhere.

It may be well to emphasize the fact that when resins are produced from difunctional phenols and some of the higher aliphatic aldehydes, such as acetaldehyde, the resultant is a comparatively soft or pitch-like resin at ordinary temperatures. Such resins become comparatively fluid at 110° to 165° C., as a rule, and thus, can be readily oxyalkylated, preferably oxyethylated, without the use of a solvent.

What has been said previously is not intended to suggest that any experimentation is necessary to determine the degree of oxyalkylation, and particularly oxyethylation. What has been said previously is submitted primarily to emphasize the fact that these remarkable oxyalkylated resins having surface-activity show unusual properties as the hydrophile character varies from a minimum to an ultimate maximum. One should not underestimate the utility of any of these polyhydric alcohols in a surface-active or sub-surface-active range without examining them by reaction with epichlorhydrin and subsequently examining the resultant for utility, either in demulsification or in some other art or industry, as referred to elsewhere, or as a reactant for the manufacture of more complicated derivatives. A few simple laboratory tests which can be conducted in a routine manner will usually give all the information that is required.

For instance, a simple rule to follow is to prepare a resin having at least three phenolic nuclei and being organic solvent-soluble. Oxyethylate such resin, using the following four ratios of moles of ethylene oxide per phenolic unit equivalent: 2 to 1; 6 to 1; 10 to 1; and 15 to 1. From a sample of each product remove any solvent that may be present, such as xylene. Prepare 0.5% and 5.0% solutions in distilled water, as previously indicated. A mere examination of such series will generally reveal an approximate range of minimum hydrophile character, moderate hydrophile character, and maximum hydrophile character. If the 2 to 1 radio does not show minimum hydrophile character by test of the solvent-free product, then one should test its capacity to form an emulsion when admixed with xylene or other insoluble solvent. If neither test shows the required minimum hydrophile property, repetition, using 2½ to 4 moles per phenolic nucleus will serve. Moderate hydrophile character should be shown by either the 6 to 1 or 10 to 1 ratio. Such moderate hydrophile character is indicated by the fact that the sol in distilled water within the previously mentioned concentration range is a permanent translucent sol when viewed in a comparatively thin layer, for instance the depth of a test tube. Ultimate hydrophile character is usually shown at the 15 to 1 ratio test in that adding a small amount of an insoluble solvent, for instance 5% of xylene, yields a product which will give, at least temporarily, a transparent or translucent sol of the kind just described. The formation of a permanent foam, when a 0.5% to 5.0% aqueous solution is shaken, is an excellent test for surface activity. Previous reference has been made to the fact that other oxyalkylating agents may require the use of increased amounts of alkylene oxide. However, if one does not even care to go to the trouble of calculating molecular weights, one can simply arbitrarily prepare compounds containing ethylene oxide equivalent to about 50% to 75% by weight, for example 65% by weight, of the resin to be oxyethylated; a second example using approximately 200% to 300% by weight, and a third example using about 500% to 750% by weight, to explore the range of hydrophile-hydrophobe balance.

A practical examination of the factor of oxyalkylation level can be made by a very simple test using a pilot plant autoclave having a capacity of about 10 to 15 gallons as hereinafter described. Such laboratory-prepared routine compounds can then be tested for solubility and, generally speaking, this is all that is required to give a suitable variety covering the hydrophile-hydrophobe range. All these tests, as stated, are intended to be routine tests and nothing more. They are intended to teach a person, even though unskilled in oxyethylation or oxyalkylation, how to prepare in a perfectly arbitrary manner, a series of compounds illustrating the hydrophile-hydrophobe range.

If one purchases a thermoplastic or fusible resin on the open market selected from a suitable number which are available, one might have to make certain determinations in order to make the quickest approach to the appropriate oxyalkylation range. For instance, one should know (a) the molecular size, indicating the number of phenolic units; (b) the nature of the aldehydic residue, which is usually $CH_2$; and (c) the nature of the substituent, which is usually butyl, amyl, or phenyl. With such information one is in substantially the same position as if one had personally made the resin prior to oxyethylation.

For instance, the molecular weight of the internal structural units of the resins of the following over-simplified formula:

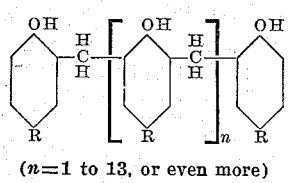

($n=1$ to 13, or even more)

is given approximately by the formula: (mol. wt. of phenol -2) plus mol. wt. of methylene or substituted methylene radical. The molecular weight of the resin would be $n$ times the value for the internal limit plus the values for the terminal units. The left-hand terminal unit of the above structural formula, it will be seen, is identical with the recurring internal unit except that it has one extra hydrogen. The right-hand terminal unit lacks the methylene bridge element. Using one internal unit of a resin as the basic element, a resin's molecular weight is given approximately by taking ($n$ plus 2) times the weight of the internal element. Where the resin molecule has only 3 phenolic nuclei as in the structure shown, this calculation will be in error by several per cent; but as it grows larger, to contain 6, 9, or 12 phenolic nuclei, the formula comes to be more than satisfactory. Using such an approximate weight, one need only introduce, for example, two molal weights of ethylene oxide or slighty more, per phenolic nucleus, to produce a product of minimal hydrophile character. Further oxyalkylation gives enhanced hydrophile character. Although we have prepared and tested a large number of oxyethylated products of the type described herein, we have found no instance where the use of less than 2 moles of ethylene oxide per phenolic nucleus gave desirable products.

Example 1b through 18b, and the table which appears in columns 51 through 56 of our said Patent 2,499,370 illustrate oxyalkylation products from resins which are useful as intermediates for producing the chloro-oxypropylated products used in accordance with the present application, such examples giving exact and complete details for carrying out the oxyalkylation procedure.

The resins, prior to oxyalkylation, vary from tacky, viscous liquids to hard, high-melting solids. Their color varies from a light yellow through amber, to a deep red or even almost black. In the manufacture of resins, particularly hard resins, as the reaction progresses the reaction mass frequently goes through a liquid state to a sub-resinous or semi-resinous state, often characterized by being tacky or sticky, to a final complete resin. As the resin is subjected to oxyalkylation these same physical changes tend to take place in reverse. If one starts with a solid resin, oxyalkylation tends to make it tacky or semi-resinous and further oxyalkylation makes the tackiness disappear and changes the product to a liquid. Thus, as the resin is oxyalkylated it decreases in viscosity, that is, becomes more liquid or changes from a solid to a liquid, particularly when it is converted to the water-dispersible or water-soluble stage. The color of the oxyalkylated derivative is usually considerably lighter than the original product from which it is made, varying from a pale straw color to an amber or reddish amber. The viscosity usually varies from that of an oil, like castor oil, to that of a thick viscous sirup. Some products are waxy. The presence of a solvent, such as 15% xylene or the like, thins the viscosity considerably and also reduces the color in dilution. No undue significance need be attached to the color for the reason that if the same compound is prepared in glass and in iron, the latter usually has somewhat darker color. If the resins are prepared as customarily employed in varnish resin manufacture, i. e., a procedure that excludes the presence of oxygen during the resinification and subsequent cooling of the resin, then of course the initial resin is much lighter in color. We have employed some resins which initially are almost water-white and also yield a lighter colored final product.

Actually, in considering the ratio of alkylene oxide to add, and we have previously pointed out that this can be predetermined using laboratory tests, it is our actual preference, from a practical standpoint, to make tests on a small pilot plant scale. Our reason for so doing is that we make one run, and only one, and that we have a complete series which shows the progressive effect of introducing the oxyalkylating agent, for instance, the ethyleneoxy radicals. Our preferred procedure is as follows: We prepare a suitable resin, or for that matter, purchase it in the open market. We employ 8 pounds of resin and 4 pounds of xylene and place the resin and xylene in a suitable autoclave with an open reflux condenser. We prefer to heat and stir until the solution is complete. We have pointed out that soft resins which are fluid or semi-fluid can be readily prepared in various ways, such as the use of ortho-tertiary amylphenol, ortho-hydroxydiphenyl, ortho-decylphenol, or by the use of higher molecular weight aldehydes than formaldehyde. If such resins are used, a solvent need not be added, but may be added as a matter of convenience or for comparison, if desired. We then add a catalyst, for instance, 2% of caustic soda, in the form of a 20% to 30% solution, and remove the water of solution or formation. We then shut off the reflux condenser and use the equipment as an autoclave only, and oxyethylate until a total of 60 pounds of ethylene oxide have been added, equivalent to 750% of the original resin. We prefer a temperature of about 150° C. to 175° C. We also take samples at intermediate points, as indicated in the following table:

| Percentages | Pounds of Ethylene Oxide Added per 8-pound Batch |
|---|---|
| 50 | 4.0 |
| 66⅔ | 5.33 |
| 75 | 6.0 |
| 100 | 8.0 |
| 150 | 12.0 |
| 200 | 16.0 |
| 300 | 24.0 |
| 400 | 32.0 |
| 500 | 40.0 |
| 600 | 48.0 |
| 750 | 60.0 |

Oxyethylation to 750% can usually be completed within 30 hours and frequently more quickly.

The samples taken are rather small, for instance, 2 to 4 ounces, so that no correction need be made in regard to the residual reaction mass. Each sample is divided in two. One-half the sample is placed in an evaporating dish on the steam bath overnight so as to eliminate the xylene. Then 1.5% solutions are prepared from both series of samples, i. e., the series with xylene present and the series with xylene removed.

Mere visual examination of any samples in solution may be sufficient to indicate hydrophile character or surface activity, i. e., the product is soluble, forming a colloidal sol, or the aqueous solution foams or shows emulsifying property. All these properties are related through adsorption at the interface, for example, a gas-liquid interface or a liquid-liquid interface. If desired, surface activity can be measured in any one of the usual ways using a DuNouy tensiometer or dropping pipette, or any other procedure for measuring interfacial tension. Such tests are conventional and require no further description. Any compound having sub-surface-activity, and all derived from the same resin and oxyalkylated to a greater extent, i. e., those having a greater proportion of alkylene oxide, are useful as polyhydric reactants for the practice of this invention.

Another reason why we prefer to use a pilot plant test of the kind above described is that we can use the same procedure to evaluate tolerance towards a trifunctional phenol such as hydroxybenzene or metacresol satisfactorily. Previous reference has been made to the fact that one can conduct a laboratory scale test which will indicate whether or not a resin, although soluble in solvent, will yield an insoluble rubbery product, i. e., a product which is neither hydrophile nor surface-active, upon oxyethylation, particularly extensive oxyethylation. It is also obvious that one may have a solvent-soluble resin derived from a mixture of phenols having present 1% or 2% of a trifunctional phenol which will result in an insoluble rubber at the ultimate stages of oxyethylation but not in the earlier stages. In other words, with resins from some such phenols, addition of 2 or 3 moles of the oxyalkylating agent per phenolic nucleus, particularly ethylene oxide, gives a surface-active reactant which is perfectly satisfactory, while more extensive oxyethylation yields an insoluble rubber, that is, an unsuitable reactant. It is obvious that this present procedure of evaluating trifunctional phenol tolerance is more suitable than the previous procedure.

It may be well to call attention to one result which may be noted in a long drawn-out oxyalkylation, particularly oxyethylation, which would not appear in a normally conducted reaction. Reference has been made to cross-linking and its effect on solubility and also the fact that, if carried far enough, it causes incipient stringiness, then pronounced stringiness, usually followed by a semi-rubbery or rubbery stage. Incipient stringiness, or even pronounced stringiness, or even the tendency toward a rubbery stage, is not objectionable so long as the final product is still hydrophile and at least sub-surface-active. Such material frequently is best mixed with a polar solvent, such as alcohol or the like, and preferably an alcoholic solution is used. The point which we want to make here, however, is this: Stringiness or rubberization at this stage may possibly be the result of etherification. Obviously if a difunctional phenol and an aldehyde produce a non-cross-linked resin molecule and if such molecule is oxyalkylated so as to introduce a plurality of hydroxyl groups in each molecule, then and in that event if subsequent etherification takes place, one is going to obtain cross-linking in the same general way that one would obtain cross-linking in other resinification reactions. Ordinarily there is little or no tendency toward etherification during the oxyalkylation step. If it does take place at all, it is only to an insignificant and undetectable degree. However, suppose that a certain weight of resin is treated with an equal weight of, or twice its weight of, ethylene oxide. This may be done in a comparatively short time, for instance, at 150° or 175° C. in 4 to 8 hours, or even less. On the other hand, if in an exploratory reaction, such as the kind previously described, the ethylene oxide were added extremely slowly in order to take stepwise samples, so that the reaction required 4 or 5 times as long to introduce an equal amount of ethylene oxide employing the same temperature, then etherification might cause stringiness or a suggestion of rubberiness. For this reason if in an exploratory experiment of the kind previously described there appears to be any stringiness or rubberiness, it may be well to repeat the experiment and reach the intermediate stage of oxyalkylation as rapidly as possible and then proceed slowly beyond this intermediate stage. The entire purpose of this modified procedure is to cut down the time of reaction so as to avoid etherification if it be caused by the extended time period.

It may be well to note one peculiar reaction sometimes noted in the course of oxyalkylation, particularly oxyethylation, of the thermoplastic resins herein described. This effect is noted in a case where a thermoplastic resin has been oxyalkylated, for instance, oxyethylated, until it gives a perfectly clear solution, even in the presence of some accompanying water-insoluble solvent such as 10% to 15% of xylene. Further oxyalkylation, particularly oxyethylation, may then yield a product which, instead of giving a clear solution as previously, gives a very milky solution suggesting that some marked change has taken place. One explanation of the above change is that the structural unit indicated in the following way where $8n$ is a fairly large number, for instance, 10 to 20, decomposes and an oxyalkylated resin representing a lower degree of oxyethylation and a less soluble one, is generated and a cyclic polymer of ethylene oxide is produced, indicated thus:

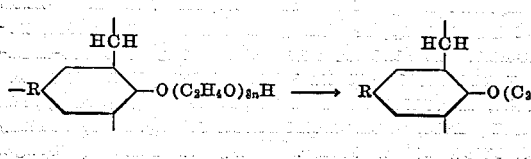 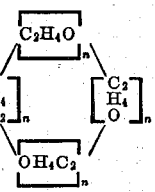

This fact, of course, presents no difficulty for the reason that oxyalkylation can be conducted in each instance stepwise, or at a gradual rate, and samples taken at short intervals so as to arrive at a point where optimum surface activity or hydrophile character is obtained if desired; for products for use as polyhydric reactants in the practice of this invention, this is not necessary and, in fact, may be undesirable, i. e., reduce the efficiency of the product.

We do not know to what extent oxyalkylation produces uniform distribution in regard to phenolic hydroxyls present in the resin molecule. In some instances, of course, such distribution cannot be uniform for the reason that we have not specified that the molecules of ethylene oxide, for example, be added in multiples of the units present in the resin molecule. This may be illustrated in the following manner:

Suppose the resin happens to have five phenolic nuclei. If a minimum of two moles of ethylene oxide per phenolic nucleus are added, this would mean an addition of 10 moles of ethylene oxide, but suppose that one added 11 moles of ethylene oxide, or 12, or 13, or 14 moles; obviously, even assuming the most uniform distribution possible, some of the polyethyleneoxy radicals would contain 3 ethyleneoxy units and some would contain 2. Therefore, it is impossible to specify uniform distribution in regard to the entrance of the ethylene oxide or other oxyalkylating agent. For that matter, if one were to introduce 25 moles of ethylene oxide there is no way to be certain that all chains of ethyleneoxy units would have 5 units; there might be some having, for example, 4 and 6 units, or for that matter 3 or 7 units. Nor is there any basis for assuming that the number of molecules of the oxyalkylating agent added to each of the molecules of the resin is the same, or different. Thus, where formulae are given to illustrate or depict the oxyalkylated products, distributions of radicals indicated are to be statistically taken. We have, however, included specific directions and specifications in regard to the total amount of ethylene oxide, or total amount of any other oxyalkylating agent, to add.

In regard to solubility of the resins and the oxyalkylated compounds, and for that matter derivatives of the latter, the following should be noted. In oxyalkylation, any solvent employed should be non-reactive to the alkylene oxide employed. This limitation does not apply to solvents used in cryoscopic determinations for obvious reasons. Attention is directed to the fact that various organic solvents may be employed to verify that the resin is organic solvent-soluble. Such solubility test merely characterizes the resin. The particular solvent used in such test may not be suitable for a molecular weight determination and, likewise, the solvent used in determining molecular weight may not be suitable as a solvent during oxyalkylation. For solution of the oxyalkylated compounds, or their derivatives a great variety of solvents may be employed, such as alcohols, ether alcohols, cresols, phenols, ketones, esters, etc., alone or with the addition of water. Some of these are mentioned hereafter. We prefer the use of benzene or diphenylamine as a solvent in making cryoscopic measurements. The most satisfactory resins are those which are soluble in xylene or the like, rather than those which are soluble only in some other solvent containing elements other than carbon and hydrogen, for instance, oxygen or chlorine. Such solvents are usually polar, semi-polar, or slightly polar in nature compared with xylene, cymene, etc.

Reference to cryoscopic measurement is concerned with the use of benzene or other suitable compound as a solvent. Such method will show that conventional resins obtained, for example, from para-tertiary amylphenol and formaldehyde, in presence of an acid catalyst, will have a molecular weight indicating 3, 4, 5 or somewhat greater number of structural units per molecule. If more drastic conditions of resinification are employed, or if such low-stage resin is subjected to a vacuum distillation treatment as previously described, one obtains a resin of a distinctly higher molecular weight. Any molecular weight determination used, whether cryoscopic measurement or otherwise, other than the conventional cryoscopic one employing benzene, should be checked so as to insure that it gives consistent values on such conventional resins as a control. Frequently all that is necessary to make an approximation of the molecular weight range is to make a comparison with the dimer obtained by chemical combination of two moles of the same phenol, and one mole of the same aldehyde under conditions to insure dimerization. As to the preparation of such dimers from substituted phenols, see Carswell "Phenoplasts," page 31. The increased viscosity, resinous character, and decreased solubility, etc., of the higher polymers, in comparison with the dimer, frequently are all that is required to establish that the resin contains 3 or more structural units per molecule.

Ordinarily, the oxyalkylation is carried out in autoclaves provided with agitators or stirring devices. We have found that the speed of the agitation markedly influences the reaction time. In some cases, the change from slow speed agitation, for example, in a laboratory autoclave agitation with a stirrer operating at a speed of 60 to 200 R. P. M., to high speed agitation, with the stirrer operating at 250 to 350 R. P. M., reduces the time required for oxyalkylation by about one-half to two-thirds. Frequently xylene-soluble products which give insoluble products by procedures employing comparatively slow speed agitation, give suitable hydrophile products, when produced by similar procedure, but with high speed agitation, as a result, we believe, of the reduction in the time required, with consequent elimination or curtailment of opportunity for curing or etherization. Even if the formation of an insoluble product is not involved, it is frequently advantageous to speed up the reaction, thereby reducing production time, by increasing agitating speed. In large scale operations, we have demonstrated that economical manufacturing results from continuous oxyalkylation, i. e., an operation in which the alkylene oxide is continuously fed to the reaction vessel, with high speed agitation, i. e., an agitator operating at 250 to 350 R. P. M. Continuous oxyalkylation, other conditions being the same, is more rapid than batch oxyalkylation, but the latter is ordinarily more convenient for laboratory operation.

Previous reference has been made to the fact that in preparing compounds of the kind herein described, particularly adapted for demulsification of water-in-oil emulsions, and for that matter, for other purposes, one should make a complete exploration of the wide variation in hydrophobe-hydrophile balance, as previously referred to. It has been stated, furthermore, that this hydrophobe-hydrophile balance of the oxyalkylated resins is imparted, as far as the range of variation goes, to a greater or lesser extent to the herein described derivatives. This means that one employing the present invention should take the choice of the most suitable derivative selected from a number of representative compounds, thus, not only should a variety of resins be prepared exhibiting a variety of oxyalkylations, particularly oxyethylation, but also a variety of derivatives. This can be done conveniently in light of what has been said previously. From a practical standpoint, using pilot plant equipment, for instance, an autoclave, having a capacity of approximately three to five gallons. We have made a single run by appropriate selections in which the molal ratio of resin equivalent to ethylene oxide is one to one, 1 to 5, 1 to 10, 1 to 15, and 1 to 20. Furthermore, in making these particular runs we have used continuous addition of ethylene oxide. In the continuous addition of ethylene oxide we have employed either a cylinder of ethylene oxide without added nitrogen, provided that the pressure of the ethylene oxide was sufficiently great to pass into the autoclave, or else we have used an arrangement which, in essence, was the equivalent of an ethylene oxide cylinder with a means for injecting nitrogen so as to force out the ethylene oxide in the manner of an ordinary seltzer bottle, combined with the means for either weighing the cylinder or measuring the ethylene oxide used volumetrically. Such procedure and arrangement for injecting liquids is, of course, conventional. The following data sheets exemplify such operations, i. e., the combination of both continuous agitation and taking samples so as to give five different variants in oxyethylation. In adding ethylene oxide continuously, there is one precaution which must be taken at all times. The addition of ethylene oxide must stop immediately if there is any indication that reaction is stopped, or, obviously, if required is not started at the beginning of the reaction period. Since the addition of ethylene oxide is invariably an exothermic reaction, whether or not reaction has taken place can be judged in the usual manner by observing (a) temperature rise or drop, if any, (b) amount of cooling water or other means required to dissipate heat of reaction; thus, if there is a temperature drop without the use of cooling water or equivalent, or if there is no rise in temperature without using cooling water control, careful investigation should be made.

In the tables immediately following, we are showing the maximum temperature which is usually the operating temperature. In other words, by experience we have found that if the initial reactants are raised to the indicated temperature and then if ethylene oxide is added slowly, this temperature is maintained by cooling water until the oxyethylation is complete. We have also indicated the maximum pressure that we obtained or the pressure range. Likewise, we have indicated the time required to inject the ethylene oxide as well as a brief note as to the solubility of the product at the end of the oxyethylation period. As one period ends it will be noted we have removed part of the oxyethylated mass to give us derivatives, as therein described; the rest has been subjected to further treatment. All this is apparent by examining the columns headed "Starting mix," "Mix at end of reaction," "Mix which is removed for sample," and "Mix which remains as next starter."

The resins employed are prepared in the manner described in Examples Nos. 1a through 103a of our said Patent 2,499,370, except that instead of being prepared on a laboratory scale they were prepared in 10 to 15-gallon electro-vapor heated synthetic resin pilot plant reactors, as manufactured by the Blaw-Knox Company, Pittsburgh, Pennsylvania, and completely described in their Bulletin No. 2087, issued in 1947, with specific reference to Specification No. 71-3965.

For convenience, the following tables give the numbers of the examples of our said Patent 2,449,370 in which the preparation of identical resins on laboratory scale are described. It is understood that in the following examples, the change is one with respect to the size of the operation.

The solvent used in each instance was xylene. This solvent is particularly satisfactory for the reason that it can be removed readily by distillation or vacuum distillation. In these continuous experiments the speed of the stirrer in the autoclave was 250 R. M.

In examining the subsequent tables it will be noted that if a comparatively small sample is taken at each stage, for instance, one-half to one gallon, one can proceed through the entire molal stage of 1 to 1, to 1 to 20, without remaking at any intermeditae stage. This is illustrated by Example 104a. In other examples we found it desirable to take a larger sample, for instance, a 3-gallon sample, at an intermediate stage. As a result it was necessary in such instances to start with a new resin sample in order to prepare sufficient oxyethylated derivatives illustrating the latter stages. Under such circumstances, of course, the earlier stages which had been previously prepared were bypassed or ignored. This is illustrated in the tables, where, obviously, it shows that the starting mix was not removed from a previous sample.

*Phenol for resin: Para-tertiary amylphenol*  *Aldehyde for resin: Formaldehyde*

Date, June 22, 1948

[Resin made in pilot plant size batch, approximately 25 pounds, corresponding to 3a of Patent 2,499,370 but this batch designated 104a.]

| | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 104b | 14.25 | 15.75 | 0 | 14.25 | 15.75 | 4.0 | 3.35 | 3.65 | 1.0 | 10.9 | 12.1 | 3.0 | 80 | 150 | ¼ | I |
| *Second Stage* | | | | | | | | | | | | | | | | |
| Resin to EtO Molal Ratio 1:5 Ex. No. 105b | 10.9 | 12.1 | 3.0 | 10.9 | 12.1 | 15.25 | 3.77 | 4.17 | 5.31 | 7.13 | 7.93 | 9.94 | 70 | 158 | ½ | ST |
| *Third Stage* | | | | | | | | | | | | | | | | |
| Resin to EtO Molal Ratio 1:10 Ex. No. 106b | 7.13 | 7.93 | 9.94 | 7.13 | 7.93 | 19.69 | 3.29 | 3.68 | 9.04 | 3.84 | 4.25 | 10.65 | 60 | 173 | ⅓ | FS |
| *Fourth Stage* | | | | | | | | | | | | | | | | |
| Resin to EtO Molal Ratio 1:15 Ex. No. 107b | 3.84 | 4.25 | 10.65 | 3.84 | 4.25 | 16.15 | 2.04 | 2.21 | 8.55 | 1.80 | 2.04 | 7.60 | 220 | 160 | ⅙ | RS |
| *Fifth Stage* | | | | | | | | | | | | | | | | |
| Resin to EtO Molal Ratio 1:20 Ex. No. 108b | 1.80 | 2.04 | 7.60 | 1.80 | 2.04 | 10.2 | | | | | | | 100 | 150 | ⅓ | QS |

I=Insoluble.  ST=Slight tendency toward becoming soluble.  FS=Fairly soluble.  RS=Readily soluble.  QS=Quite soluble.

*Phenol for resin: Nonylphenol*  *Aldehyde for resin: Formaldehyde*

Date, June 18, 1948

[Resin made in pilot plant size batch, approximately 25 pounds, corresponding to 70a of Patent 2,499,370 but this batch designated 109a.]

| | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 109b | 15.0 | 15.0 | 0 | 15.0 | 15.0 | 3 | 5.0 | 5.0 | 1.0 | 10.0 | 10.0 | 2.0 | 50 | 150 | 1¾ | ST |
| *Second Stage* | | | | | | | | | | | | | | | | |
| Resin to EtO Molal Ratio 1:5 Ex. No. 110b | 10 | 10 | 2.0 | 10 | 10 | 9.4 | 2.72 | 2.72 | 2.56 | 7.27 | 7.27 | 6.86 | 100 | 147 | 2 | DT |
| *Third Stage* | | | | | | | | | | | | | | | | |
| Resin to EtO Molal Ratio 1:10 Ex. No. 111b | 7.27 | 7.27 | 6.86 | 7.27 | 7.27 | 13.7 | 4.16 | 4.16 | 7.68 | 3.15 | 3.15 | 5.95 | 125 | 155 | 1¾ | S |
| *Fourth Stage* | | | | | | | | | | | | | | | | |
| Resin to EtO Molal Ratio 1:15 Ex. No. 112b | 3.15 | 3.15 | 5.95 | 3.15 | 3.15 | 8.95 | 1.05 | 1.05 | 2.95 | 2.10 | 2.10 | 6.00 | 220 | 174 | 2¼ | S |
| *Fifth Stage* | | | | | | | | | | | | | | | | |
| Resin to EtO Molal Ratio 1:20 Ex. No. 113b | 2.10 | 2.10 | 6.00 | 2.10 | 2.10 | 8.00 | | | | | | | 220 | 183 | ⅔ | VS |

S=Soluble.  ST=Slight tendency toward solubility.  DT=Definite tendency toward solubility.  VS=Very soluble.

*Phenol for resin: Para-octylphenol    Aldehyde for resin: Formaldehyde*

Date, June 23, 24, 1948

[Resin made in pilot plant size batch, approximately 25 pounds, corresponding to 8a of Patent 2,499,370 but this batch designated 114a.]

| | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 114b | 14.2 | 15.8 | 0 | 14.2 | 15.8 | 3.25 | 3.1 | 3.4 | 0.75 | 11.1 | 12.4 | 2.5 | 50 | 150 | 1½ | NS |
| *Second Stage* | | | | | | | | | | | | | | | | |
| Resin to EtO Molal Ratio 1:5 Ex. No. 115b | 11.1 | 12.4 | 2.5 | 11.1 | 12.4 | 12.5 | 7.0 | 7.82 | 7.88 | 4.1 | 4.58 | 4.62 | 100 | 171 | ½ | SS |
| *Third Stage* | | | | | | | | | | | | | | | | |
| Resin to EtO Molal Ratio 1:10 Ex. No. 116b | 6.64 | 7.36 | 0 | 6.64 | 7.36 | 15.0 | | | | | | | 120 | 190 | 1½ | S |
| *Fourth Stage* | | | | | | | | | | | | | | | | |
| Resin to EtO Molal Ratio 1:15 Ex. No. 117b | 4.40 | 4.9 | 0 | 4.4 | 4.9 | 14.8 | | | | | | | 400 | 160 | ½ | VS |
| *Fifth Stage* | | | | | | | | | | | | | | | | |
| Resin to EtO Molal Ratio 1:20 Ex. No. 118b | 4.1 | 4.58 | 4.62 | 4.1 | 4.58 | 18.52 | | | | | | | 260 | 172 | ⅓ | VS |

S = Soluble.   NS = Not soluble.   SS = Somewhat soluble.   VS = Very soluble.

*Phenol for resin: Menthylphenol    Aldehyde for resin: Formaldehyde*

Date, July 8-13, 1948

[Resin made in pilot plant size batch, approximately 25 pounds, corresponding to 69a of Patent 2,499,370 but this batch designated 119a.]

| | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 119b | 13.65 | 16.35 | 0 | 13.65 | 16.35 | 3.0 | 9.55 | 11.45 | 2.1 | 4.1 | 4.9 | 0.9 | 60 | 150 | 1⅙ | NS |
| *Second Stage* | | | | | | | | | | | | | | | | |
| Resin to EtO Molal Ratio 1:5 Ex. No. 120b | 10 | 12 | 0 | 10 | 12 | 10.75 | 4.52 | 5.42 | 4.81 | 5.48 | 6.58 | 5.94 | 140 | 160 | 1 5/12 | S |
| *Third Stage* | | | | | | | | | | | | | | | | |
| Resin to EtO Molal Ratio 1:10 Ex. No. 121b | 5.48 | 6.58 | 5.94 | 5.48 | 6.58 | 10.85 | | | | | | | 90 | 160 | ¼ | S |
| *Fourth Stage* | | | | | | | | | | | | | | | | |
| Resin to EtO Molal Ratio 1:15 Ex. No. 122b | 4.1 | 4.9 | 0.9 | 4.1 | 4.9 | 13.15 | | | | | | | 180 | 171 | 1 5/12 | VS |
| *Fifth Stage* | | | | | | | | | | | | | | | | |
| Resin to EtO Molal Ratio 1:20 Ex. No. 123b | 3.10 | 3.72 | 0.68 | 3.10 | 3.72 | 13.43 | | | | | | | 320 | 170 | ¾ | VS |

S = Soluble.   NS = Not soluble.   VS = Very soluble.

*Phenol for resin: Para-secondary butylphenol*  *Aldehyde for resin: Formaldehyde*

Date, July 14–15, 1948

[Resin made in pilot plant size batch, approximately 25 pounds, corresponding to 2a of Patent 2,499,370 but this batch designated 124a.]

| | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1. Ex. No. 124b | 14.45 | 15.55 | 0 | 14.45 | 15.55 | 4.25 | 5.97 | 6.38 | 1.75 | 8.48 | 9.17 | 2.50 | 60 | 150 | 5½ | NS |
| *Second Stage* | | | | | | | | | | | | | | | | |
| Resin to EtO Molal Ratio 1:5. Ex. No. 125b | 8.48 | 9.17 | 2.50 | 8.48 | 9.17 | 16.0 | 5.83 | 6.32 | 11.05 | 2.65 | 2.85 | 4.95 | 95 | 188 | ½ | SS |
| *Third Stage* | | | | | | | | | | | | | | | | |
| Resin to EtO Molal Ratio 1:10. Ex. No. 126b | 4.82 | 5.18 | 0 | 4.82 | 5.18 | 14.25 | | | | | | | 400 | 183 | ½ | S |
| *Fourth Stage* | | | | | | | | | | | | | | | | |
| Resin to EtO Molal Ratio 1:15. Ex. No. 127b | 3.85 | 4.15 | 0 | 3.85 | 4.15 | 17.0 | | | | | | | 120 | 180 | ¾ | VS |
| *Fifth Stage* | | | | | | | | | | | | | | | | |
| Resin to EtO Molal Ratio 1:20. Ex. No. 128b | 2.65 | 2.85 | 4.95 | 2.65 | 2.85 | 15.45 | | | | | | | 80 | 170 | 5½ | VS |

S=Soluble.   NS=Not soluble.   SS=Somewhat soluble.   VS=Very soluble.

*Phenol for resin: Menthyl*  *Aldehyde for resin: Propionaldehyde*

Date August 12–13, 1948

[Resin made on pilot plant size batch, approximately 25 pounds, corresponding to 81a of Patent 2,499,370 but this batch designated 129a.]

| | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1. Ex. No. 129b | 12.8 | 17.2 | | 12.8 | 17.2 | 2.75 | 4.25 | 5.7 | 0.95 | 8.55 | 11.50 | 1.80 | 110 | 150 | ⅓ | Not soluble. |
| *Second Stage* | | | | | | | | | | | | | | | | |
| Resin to EtO Molal Ratio 1:5. Ex. No. 130b | 8.55 | 11.50 | 1.80 | 8.55 | 11.50 | 9.3 | 4.78 | 6.42 | 5.2 | 3.77 | 5.08 | 4.10 | 100 | 170 | ⅙ | Somewhat soluble. |
| *Third Stage* | | | | | | | | | | | | | | | | |
| Resin to EtO Molal Ratio 1:10. Ex. No. 131b | 3.77 | 5.08 | 4.10 | 3.77 | 5.08 | 13.1 | | | | | | | 100 | 182 | ½ | Soluble. |
| *Fourth Stage* | | | | | | | | | | | | | | | | |
| Resin to EtO Molal Ratio 1:15. Ex. No. 132b | 5.2 | 7.0 | | 5.2 | 7.0 | 17.0 | 3.10 | 4.17 | 10.13 | 2.10 | 2.83 | 6.87 | 200 | 182 | ¼ | Very soluble. |
| *Fifth Stage* | | | | | | | | | | | | | | | | |
| Resin to EtO Molal Ratio 1:20. Ex. No. 133b | 2.10 | 2.83 | 6.87 | 2.10 | 2.83 | 9.12 | | | | | | | 90 | 150 | ⅙ | Very soluble. |

*Phenol for resin: Para-tertiary amylphenol    Aldehyde for resin: Furfural*

Date, August 27-31, 1948

[Resin made on pilot plant size batch, approximately 25 pounds, corresponding to 42a of Patent 2,499,370 but this batch designated as 134a.]

| | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 134b | 11.2 | 18.0 | ------ | 11.2 | 18.0 | 3.5 | 2.75 | 4.4 | 0.85 | 8.45 | 13.6 | 2.65 | 120 | 135 | ½ | Not soluble. |
| *Second Stage* | | | | | | | | | | | | | | | | |
| Resin to EtO Molal Ratio 1:5 Ex. No. 135b | 8.45 | 13.6 | 2.65 | 8.45 | 13.6 | 12.65 | 5.03 | 8.12 | 7.55 | 3.42 | 5.48 | 5.10 | 110 | 150 | ¼ | Somewhat soluble. |
| *Third Stage* | | | | | | | | | | | | | | | | |
| Resin to EtO Molal Ratio 1:10 Ex. No. 136b | 4.5 | 8.0 | ------ | 4.5 | 8.0 | 14.5 | 2.45 | 4.35 | 7.99 | 2.05 | 3.65 | 6.60 | 180 | 163 | ½ | Soluble. |
| *Fourth Stage* | | | | | | | | | | | | | | | | |
| Resin to EtO Molal Ratio 1:15 Ex. No. 137b | 3.42 | 5.48 | 5.10 | 3.42 | 5.48 | 15.10 | ------ | ------ | ------ | ------ | ------ | ------ | 180 | 188 | ⅓ | Very soluble. |
| *Fifth Stage* | | | | | | | | | | | | | | | | |
| Resin to EtO Molal Ratio 1:20 Ex. No. 138b | 2.05 | 3.65 | 6.60 | 2.05 | 3.65 | 13.35 | ------ | ------ | ------ | ------ | ------ | ------ | 120 | 125 | ½ | Very soluble. |

*Phenol for resin: Menthyl    Aldehyde for resin: Furfural*

Date, Sept. 23-24, 1948

[Resin made on pilot size batch, approximately 25 pounds, corresponding to 89a of Patent 2,499,370 but this batch designated as 139a.]

| | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 139b | 10.25 | 17.75 | ------ | 10.25 | 17.75 | 2.5 | 2.65 | 4.60 | 0.65 | 7.6 | 13.15 | 1.85 | 90 | 150 | ½ | Not soluble. |
| *Second Stage* | | | | | | | | | | | | | | | | |
| Resin to EtO Molal Ratio 1:5 Ex. No. 140b | 7.6 | 13.15 | 1.85 | 7.6 | 13.15 | 9.35 | 5.2 | 9.00 | 6.40 | 2.4 | 4.15 | 2.95 | 80 | 177 | ½ | Somewhat soluble. |
| *Third Stage* | | | | | | | | | | | | | | | | |
| Resin to EtO Molal Ratio 1:10 Ex. No. 141b | 4.22 | 6.98 | ------ | 4.22 | 6.98 | 10.0 | ------ | ------ | ------ | ------ | ------ | ------ | 90 | 165 | ½ | Soluble. |
| *Fourth Stage* | | | | | | | | | | | | | | | | |
| Resin to EtO Molal Ratio 1:15 Ex. No. 142b | 3.76 | 6.24 | ------ | 3.76 | 6.24 | 13.25 | ------ | ------ | ------ | ------ | ------ | ------ | 100 | 171 | ½ | Very soluble. |
| *Fifth Stage* | | | | | | | | | | | | | | | | |
| Resin to EtO Molal Ratio 1:20 Ex. No. 143b | 2.4 | 4.15 | 2.95 | 2.4 | 4.15 | 11.70 | ------ | ------ | ------ | ------ | ------ | ------ | 90 | 150 | ½ | Very soluble. |

Date, October 7-8, 1948    *Phenol for resin: Para-octyl    Aldehyde for resin: Furfural*

[Resin made on pilot plant size batch, approximately 25 pounds, corresponding to 42a of Patent 2,499,370 with 206 parts by weight of commercial para-octylphenol replacing 164 parts by weight of para-tertiary amylphenol but this batch designated as 144a.]

| | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 144b | 12.1 | 18.6 | ------ | 12.1 | 18.6 | 3.0 | 5.38 | 8.28 | 1.34 | 6.72 | 10.32 | 1.66 | 80 | 150 | ½ | Insoluble. |
| *Second Stage* | | | | | | | | | | | | | | | | |
| Resin to EtO Molal Ratio 1:5 Ex. No. 145b | 9.25 | 14.25 | ------ | 9.25 | 14.25 | 11.0 | 3.73 | 5.73 | 4.44 | 5.52 | 8.52 | 6.56 | 100 | 177 | 5½ | Slight tendency toward becoming soluble. |
| *Third Stage* | | | | | | | | | | | | | | | | |
| Resin to EtO Molal Ratio 1:10 Ex. No. 146b | 6.72 | 10.32 | 1.66 | 6.72 | 10.32 | 14.91 | 4.97 | 7.62 | 11.01 | 1.75 | 2.70 | 3.90 | 85 | 182 | ¼ | Fairly soluble. |
| *Fourth Stage* | | | | | | | | | | | | | | | | |
| Resin to EtO Molal Ratio 1:15 Ex. No. 147b | 5.52 | 8.52 | 6.56 | 5.52 | 8.52 | 19.81 | ------ | ------ | ------ | ------ | ------ | ------ | 100 | 176 | ⅓ | Readily soluble. |
| *Fifth Stage* | | | | | | | | | | | | | | | | |
| Resin to EtO Molal Ratio 1:20 Ex. No. 148b | 1.75 | 2.70 | 3.90 | 1.75 | 2.70 | 8.4 | ------ | ------ | ------ | ------ | ------ | ------ | 80 | 160 | ¼ | Quite soluble. |

Date, October 11-13, 1948    *Phenol for resin: Para-phenyl    Aldehyde for resin: Furfural*

[Resin made on pilot plant size batch, approximately 25 pounds, corresponding to 42a of Patent 2,499,370 with 170 parts by weight of commercial paraphenylphenol replacing 164 parts by weight of para-tertiary amylphenol but this batch designated as 149a.]

| | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 149b | 13.9 | 16.7 | ------ | 13.9 | 16.7 | 3.0 | 3.50 | 4.25 | 0.80 | 10.35 | 12.45 | 2.20 | 100 | 160 | ½ | Insoluble. |
| *Second Stage* | | | | | | | | | | | | | | | | |
| Resin to EtO Molal Ratio 1:5 Ex. No. 150b | 10.35 | 12.45 | 2.20 | 10.35 | 12.45 | 12.20 | 5.15 | 6.19 | 6.06 | 5.20 | 6.26 | 6.14 | 80 | 183 | ¼ | Slight tendency toward solubility. |
| *Third Stage* | | | | | | | | | | | | | | | | |
| Resin to EtO Molal Ratio 1:10 Ex. No. 151b | 8.90 | 10.7 | ------ | 8.90 | 10.70 | 19.0 | 5.30 | 6.38 | 11.32 | 3.60 | 4.32 | 7.68 | 90 | 193 | 7½ | Fairly soluble. |
| *Fourth Stage* | | | | | | | | | | | | | | | | |
| Resin to EtO Molal Ratio 1:15 Ex. No. 152b | 5.20 | 6.26 | 6.14 | 5.20 | 6.26 | 16.64 | ------ | ------ | ------ | ------ | ------ | ------ | 100 | 171 | ⅙ | Readily soluble. |
| *Fifth Stage* | | | | | | | | | | | | | | | | |
| Resin to EtO Molal Ratio 1:20 Ex. No. 153b | 3.60 | 4.32 | 7.68 | 3.60 | 4.32 | 15.68 | Sample somewhat rubbery and gelatinous but fairly soluble | | | | | | 230 | 170 | 2 | |

*Phenol for resin: Para-nonylphenol*     *Aldehyde for resin: Furfural*

Date, October 13-15, 1948

[Resin made on pilot plant size batch, approximately 25 pounds, corresponding to 88a of Patent 2,499,370 but this batch designated as 154a.]

|  | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solublity |
|---|---|---|---|---|---|---|---|---|---|---|---|---|---|---|---|---|
|  | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO |  |  |  |  |
| *First Stage* | | | | | | | | | | | | | | | | |
| Resin to EtO Molal Ratio 1:1 Ex. No. 154b | 10.85 | 20.75 | ------ | 10.85 | 20.75 | 3.0 | 2.57 | 4.90 | 0.73 | 8.28 | 15.85 | 2.27 | 100 | 150 | ⅓ | Insoluble. |
| *Second Stage* | | | | | | | | | | | | | | | | |
| Resin to EtO Molal Ratio 1:5 Ex. No. 155b | 8.28 | 15.85 | 2.27 | 8.28 | 15.85 | 11.77 | 3.82 | 7.33 | 5.45 | 4.46 | 8.52 | 6.32 | 100 | 182 | ⅙ | Slight tendency toward becoming soluble. |
| *Third Stage* | | | | | | | | | | | | | | | | |
| Resin to EtO Molal Ratio 1:10 Ex. No. 156b | 5.95 | 11.35 | ------ | 5.95 | 11.35 | 16.75 | 3.38 | 6.42 | 9.50 | 2.57 | 4.93 | 7.25 | 100 | 181 | ½ | Fairly soluble. |
| *Fourth Stage* | | | | | | | | | | | | | | | | |
| Resin to EtO Molal Ratio 1:15 Ex. No. 157b | 4.46 | 8.52 | 6.32 | 4.46 | 8.52 | 19.07 | ------ | ------ | ------ | ------ | ------ | ------ | 90 | 188 | ⅙ | Readily soluble. |
| *Fifth Stage* | | | | | | | | | | | | | | | | |
| Resin to EtO Molal Ratio 1:20 Ex. No. 158b | 2.57 | 4.93 | 7.25 | 2.57 | 4.93 | 14.50 | ------ | ------ | ------ | ------ | ------ | ------ | 100 | 160 | ⅓ | Quite soluble. |

*Phenol for resin: Para-phenylphenol*     *Aldehyde for resin: Formaldehyde*

Date, October 15, 1948

[Resin made on pilot plant size batch, approximately 25 pounds, corresponding to 9a of Patent 2,499,370 but this batch designated as 159a.]

|  | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
|  | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO |  |  |  |  |
| *First Stage* | | | | | | | | | | | | | | | | |
| Resin to EtO Molal Ratio 1:1 Ex. No. | ------ | ------ | ------ | ------ | ------ | ------ | ------ | ------ | ------ | ------ | ------ | ------ | ------ | ------ | ------ |  |
| *Second Stage* | | | | | | | | | | | | | | | | |
| Resin to EtO Molal Ratio 1:5 Ex. No. 159b | 11.0 | 9.0 | ------ | 11.0 | 9.0 | 11.75 | 7.6 | 6.2 | 8.11 | 3.41 | 2.80 | 3.64 | 160 | 188 | ¼ | Insoluble. |
| *Third Stage* | | | | | | | | | | | | | | | | |
| Resin to EtO Molal Ratio 1:10 Ex. No. | ------ | ------ | ------ | ------ | ------ | ------ | ------ | ------ | ------ | ------ | ------ | ------ | ------ | ------ | ------ |  |
| *Fourth Stage* | | | | | | | | | | | | | | | | |
| Resin to EtO Molal Ratio 1:15 Ex. No. | ------ | ------ | ------ | ------ | ------ | ------ | ------ | ------ | ------ | ------ | ------ | ------ | ------ | ------ | ------ |  |
| *Fifth Stage* | | | | | | | | | | | | | | | | |
| Resin to EtO Molal Ratio 1:20 Ex. No. 160b | 3.41 | 2.80 | 3.64 | 3.41 | 2.80 | 13.64 | ------ | ------ | ------ | ------ | ------ | ------ | 80 | 170 | ¼ | Soluble. |

*Phenol for resin: Para-secondary butylphenol*     *Aldehyde for resin: Furfural*

Date, October 19, 25, 1948

[Resin made on pilot plant size batch, approximately 25 pounds, corresponding to 42a of Patent 2,499,370 with 150 parts by weight of commercial para-secondary butylphenol replacing 164 parts by weight of para-tertiary amylphenol but this batch designated as 161a.]

|  | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
|  | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO |  |  |  |  |
| *First Stage* Resin to EtO Molal Ratio 1:1 Ex. No. 161b | 12.0 | 17.9 | ------ | 12.0 | 17.9 | 3.5 | 2.65 | 3.98 | 0.77 | 9.35 | 13.92 | 2.73 | 150 | 171 | ⅙ | Insoluble. |
| *Second Stage* Resin to EtO Molal Ratio 1:5 Ex. No. 162b | 9.35 | 13.92 | 2.73 | 9.35 | 13.92 | 13.23 | 5.00 | 7.42 | 7.08 | 4.35 | 6.50 | 6.15 | 100 | 192 | ⅓ | Slight tendency toward becoming soluble. |
| *Third Stage* Resin to EtO Molal Ratio 1:10 Ex. No. 163b | 6.25 | 8.95 | ------ | 6.25 | 8.95 | 17.0 | 3.23 | 4.61 | 8.76 | 3.02 | 4.34 | 8.24 | 120 | 188 | 2½ | Fairly soluble. |
| *Fourth Stage* Resin to EtO Molal Ratio 1:15 Ex. No. 164b | 4.35 | 6.50 | 6.15 | 4.35 | 6.50 | 18.40 | ------ | ------ | ------ | ------ | ------ | ------ | 100 | 181 | ⅓ | Readily soluble. |
| *Fifth Stage* Resin to EtO Molal Ratio 1:20 Ex. No. 165b | 3.02 | 4.34 | 8.24 | 3.02 | 4.34 | 16.49 | Sample somewhat rubbery and gelatinous but shows limited water solubility. | | | | | | 120 | 161 | ¾ |  |

*Phenol for resin: Para-octylphenol*     *Aldehyde for resin: Propionaldehyde*

Date, October 27, 1948

[Resin made on pilot plant size batch, approximately 25 pounds, corresponding to 34a of Patent 2,499,370 with 206 parts by weight of commercial para-octylphenol replacing 164 parts by weight of para-tertiary amylphenol but this batch designated as 166a.]

|  | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
|  | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO |  |  |  |  |
| *First Stage* Resin to EtO Molal Ratio 1:1 Ex. No. 166b | 13.3 | 16.9 | ------ | 13.3 | 16.9 | 3.0 | 3.1 | 4.0 | 0.70 | 10.2 | 12.9 | 2.3 | 100 | 150 | ⅓ | Insoluble. |
| *Second Stage* Resin to EtO Molal Ratio 1:5 Ex. No. 167b | 10.2 | 12.9 | 2.3 | 10.2 | 12.9 | 11.3 | 6.34 | 8.03 | 7.03 | 3.86 | 4.87 | 4.27 | 100 | 166 | ¼ | Becoming soluble. |
| *Third Stage* Resin to EtO Molal Ratio 1:11.3 Ex. No. 168b | 6.46 | 8.24 | ------ | 6.46 | 8.24 | 16.5 | 3.52 | 4.49 | 8.99 | 2.94 | 3.75 | 7.51 | 80 | 177 | ¼ | Fairly soluble. |
| *Fourth Stage* Resin to EtO Molal Ratio 1:15 Ex. No. 169b | 3.86 | 2.87 | 4.27 | 3.86 | 4.87 | 13.02 | ------ | ------ | ------ | ------ | ------ | ------ | 80 | 204 | ¼ | Readily soluble. |
| *Fifth Stage* Resin to EtO Molal Ratio 1:20 Ex. No. 170b | 2.94 | 3.75 | 7.51 | 2.94 | 3.75 | 13.26 | ------ | ------ | ------ | ------ | ------ | ------ | 100 | 150 | ¼ | Soluble. |

Phenol for resin: Para-nonylphenol    Aldehyde for resin: Propionaldehyde

Date, October 28, 1948

[Resin made on pilot plant size batch, approximately 25 pounds, corresponding to 82a of Patent 2,499,370 but this batch designated as 171a.]

| | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 171b | 10.9 | 18.0 | ------ | 10.9 | 18.0 | 3.0 | 2.65 | 4.4 | 0.75 | 8.25 | 13.60 | 2.25 | 120 | 150 | ½ | Insoluble. |
| *Second Stage* | | | | | | | | | | | | | | | | |
| Resin to EtO Molal Ratio 1:5 Ex. No. 172b | 8.25 | 13.60 | 2.25 | 8.25 | 13.60 | 11.50 | 5.10 | 8.35 | 7.05 | 3.15 | 5.25 | 4.45 | 95 | 174 | ½ | Becoming soluble. |
| *Third Stage* | | | | | | | | | | | | | | | | |
| Resin to EtO Molal Ratio 1:10 Ex. No. 173b | 5.65 | 9.35 | ------ | 5.65 | 9.35 | 15.75 | 3.71 | 6.14 | 10.35 | 1.94 | 3.21 | 5.40 | 90 | 182 | ½ | Fairly soluble. |
| *Fourth Stage* | | | | | | | | | | | | | | | | |
| Resin to EtO Molal Ratio 1:15 Ex. No. 174b | 3.15 | 5.25 | 4.45 | 3.15 | 5.25 | 13.45 | ------ | ------ | ------ | ------ | ------ | ------ | 85 | 182 | ½ | Readily soluble. |
| *Fifth Stage* | | | | | | | | | | | | | | | | |
| Resin to EtO Molal Ratio 1:20 Ex. No. 175b | 1.94 | 3.21 | 5.40 | 1.94 | 3.21 | 10.65 | ------ | ------ | ------ | ------ | ------ | ------ | 90 | 150 | ½ | Soluble. |

Phenol for resin: Para-tertiary amylphenol    Aldehyde for resin: Propionaldehyde Date, October 28, 29, 1948

[Resin made on pilot plant size batch, approximately 25 pounds, corresponding to 34a of Patent 2,499,370 but this batch designated as 176a.]

| | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 176b | 12.6 | 16.2 | ------ | 12.6 | 16.2 | 3.5 | 3.08 | 3.96 | 0.86 | 9.52 | 12.24 | 2.64 | 105 | 150 | ½ | Insoluble. |
| *Second Stage* | | | | | | | | | | | | | | | | |
| Resin to EtO Molal Ratio 1:5 Ex. No. 177b | 9.52 | 12.24 | 2.64 | 9.52 | 12.24 | 12.89 | 5.27 | 6.79 | 7.14 | 4.25 | 5.45 | 5.75 | 85 | 171 | ½ | Becoming soluble. |
| *Third Stage* | | | | | | | | | | | | | | | | |
| Resin to EtO Molal Ratio 1:10 Ex. No. 178b | 6.5 | 8.3 | ------ | 6.5 | 8.3 | 17.75 | 3.81 | 4.87 | 10.42 | 2.69 | 3.43 | 7.33 | 120 | 183 | ½ | Fairly soluble. |
| *Fourth Stage* | | | | | | | | | | | | | | | | |
| Resin to EtO Molal Ratio 1:15 Ex. No. 179b | 4.25 | 5.45 | 5.75 | 4.25 | 5.45 | 17.25 | ------ | ------ | ------ | ------ | ------ | ------ | 85 | 196 | ½ | Readily soluble. |
| *Fifth Stage* | | | | | | | | | | | | | | | | |
| Resin to EtO Molal Ratio 1:20 Ex. No. 180b | 2.69 | 3.43 | 7.33 | 2.69 | 3.43 | 14.55 | ------ | ------ | ------ | ------ | ------ | ------ | 95 | 160 | ½ | Soluble. |

PART 3

The reaction of epichlorohydrin is, in essence, a continuation of the reaction involving ethylene oxide, propylene oxide, or the like. The same equipment can be used, but it is desirable to make a slight change in the matter of catalyst. The usual catalyst in the oxyalkylation of a material when neither reactant contains chlorine is an alkali such as has been pointed out previously. However, if either reactant contains chlorine another type of reactant can be employed advantageously, to wit, one of the metallic chlorides such as ferric chloride, tin chloride, etc. At times it is substantially necessary to use such a catalyst, for the reason that if an alkali is used, it reacts with a labile chlorine and the catalyst is lost. Our preferred procedure then is to add a slight amount of para-toluene sulfonic acid to the products obtained in Part 2, immediately preceding, so as to neutralize any residual alkalinity. We have then added small amounts of stannic chloride as a catalyst, so as to accelerate the reaction with epichlorohydrin. The amount used is less than one-half of one percent, based on the weight of the material, and usually one or two grams of stannic chloride are sufficient in a reaction involving 300 to 600 grams of reactants. Due to the higher boiling point of epichlorohydrin, as compared with ethylene oxide, for example, one can use identically the same equipment as employed in the manufacture of resins, as described in Example 1a of our Patent 2,499,370. In fact, it is our preference to use this particular equipment on a laboratory scale.

Example 1c

The equipment employed was specifically that described in Example 1a of our Patent 2,499,370. The resin solution employed was that described as 105b, preceding. Note that in this instance, and in all subsequent examples, just sufficient para-toluene sulfonic acid was added in each case, if required, to bring the product to substantially a neutral state, i. e., neutral or very faintly acid to methyl orange indicator. 444 grams of the oxyethylated resin solution were used, and to this there was added 1.6 grams of stannic chloride. The mixture was stirred and heated to 95° C. The above amount represented .8 of a mole per phenolic hydroxyl, based on the original phenol employed. The amount of epichlorohydrin added was just sufficient to react with all the phenolic hydroxyls, to wit, .8 of a mole, or 73.6 grams. The epichlorohydrin was added drop-wise with stirring and all of it was added within a 20-minute period. There was no appreciable rise in temperature, and, in fact, the temperature had dropped to 88° C., after addition of the epichlorohydrin. The reaction mix was somewhat lighter in color. The reaction mix was then heated with stirring until a temperature of 130° C. was reached. At this point some of the liquid started to reflux at about 125° to 130° C., with a thermometer in the vapor reading 127° C. No reactant passed into the condenser. This indicated that the epichlorohydrin must have reacted completely at the end of this period for the reason that it boils at 117° C. The yield was 520 grams which contained approximately 25% xylene. In all cases the treatment with epichlorohydrin does not seem to darken the appearance of the initial reactant, and, if anything, appears to make the color lighter. It seems to reduce the viscosity perhaps a trifle, at the most, but definitely does reduce water-solubility. Our preference in all instances was to obtain materials which, after treatment with epichlorohydrin, showed water-solubiilty at least equal to that described as desirable in connection with the oxyalkylated resin prior to treatment with epichlorohydrin. Stated another way, such material should meet the emulsification test, using xylene as previously described in Part 2.

Example 2c

The same procedure was followed as in Example 1c, preceding, except that the oxyalkylated resin solution employed was that previously described under the heading 117b in Part 2. The reactants employed were as follows: 645 grams of the resin solution; 55 grams of epichlorohydrin, and 1.2 grams of stannic chloride. The catalyst and the oxyalkylated resin solution were mixed together as in Example 1c, and the epichlorohydrin added in a 10-minute period without any temperature rise. The temperature was then raised to 135° to 140° C. As the temperature moved upward there was a certain amount of refluxing which took place at 127° C. This reflux appeared for only a short period of time and then the temperature rose rather rapidly to the predetermined point of 135° to 140° C. It was held at this temperature for one hour. At the end of this time, the reaction was complete. The final yield was approximately 700 grams containing about 20% xylene.

Example 3c

The same procedure was followed as in Example 1c, preceding, except that the resin solution employed was that described as 123b in Part 2, preceding. The amount of this resin solution employed was 797 grams. The amount of catalyst employed was 1.2 grams. The amount of epichlorohydrin employed was 55.2 grams. The resin, plus the catalyst, was heated to about 110° C. and then the epichlorohydrin added in 15 minutes. The temperature remained at 110° to 115° C. for a short period of time and then was raised to 140° C. and stirred for 30 minutes. The yield was about 850 grams, containing about 17% xylene.

The same procedure was followed in a number of similar products and the data for this series is tabulated in the table below:

| Ex. No. | Oxy-alk. Resin Sol. | Amt. in Grams | Epichlor. Used, Grams | SnCl4, Grams | Max. React. Temp., °C. | React. Period, Hours | Yield, Grams | Solv. Present Final Prod., Per cent |
|---|---|---|---|---|---|---|---|---|
| 1c | 105b | 444 | 73.6 | 1.6 | 130 | 1 | 519 | 24.4 |
| 2c | 117b | 645 | 55.0 | 1.2 | 140 | 1 | 702 | 20.0 |
| 3c | 123b | 797 | 55.2 | 1.2 | 140 | ½ | 853 | 16.8 |
| 4c | 128b | 716 | 55.2 | 1.2 | 140 | 1 | 772 | 11.7 |
| 5c | 132b | 1,135 | 230 | 2.0 | 140 | 1 | 1,367 | 14.7 |
| 6c | 132b | 911 | 153 | 2.0 | 140 | 2½ | 1,064 | 12.6 |
| 7c [1] | 132b | 532 | 153 | 2.0 | 130 | 4 | 600 | 15.0 |
| 8c | 132b | 554 | 370 | 2.0 | 130 | 7 | 926 | .6 |
| 9c | 136b | 1,025 | 57.8 | 2.0 | 130 | 1 | 1,085 | 15.8 |
| 10c [1] | 136b | 521 | 250 | 1.0 | 131 | 4 | 500 | 13 |
| 11c | 163b | 1,149 | 129.5 | 3.0 | 135 | 1½ | 1,282 | 17.3 |
| 12c [1] | 136b | 820 | 278 | 6.0 | 125 | 12 | 1,073 | 12.8 |
| 13c | 140b | 710 | 92.5 | 2.0 | 135 | 1 | 804 | 22.2 |
| 14c | 140b | 710 | 46.2 | 2.0 | 130 | 1 | 758 | 23 |
| 15c [2] | 104a | 528 | 278 | 6.0 | 100 | 1½ | 1,164 | 30 |

[1] In these experiments apparently some of the epichlorohydrin was lost through the condenser. The amount which combined is definitely less than the initial amount, in view of the lower final yield.
[2] In this case an unoxyethylated resin was dissolved with enough added xylene to give a solution containing 40% xylene and 60% resin. The ultimate product was diluted with enough additional xylene so that the final product contained 30% xylene and 70% resin which had been treated with epichlorohydrin.

The chloro-oxypropylated compounds previously described have been prepared in presence of a slight amount of solvent, such as xylene. This xylene usually was residual from the preparation of the resin and carried through the oxyalkylation stage and into the final stage. We have found this purely as a matter of convenience, particularly since solvent may be present for subsequent use, i. e., demulsification, or for the preparation of more complex derivatives. Needless to say, the solvent can be removed in the same was as has been described in Part 1 in regard to its removal from the resin, or in Part 2. In other words, the solvent, such as xylene, can be distilled out and particularly employing a vacuum and about 20 to 40 mm. of mercury or thereabouts, and a temperature of 130° C.

PART 4

In practising our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accummulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicialized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the board process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accomanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the chloro-oxypropylated oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 1c with 15 parts by weight of xylene and 10 parts by weight of isopropyl alcohol, an excellent demulsifier is obtained. Selection of the solvent will vary, depending upon the solubility characteristics of the oxyalkylated product, and of course, will be dictated in part by economic considerations, i. e., cost.

As noted above, the products herein described may be used not only in diluted form, but also may be used admixed with some other chemical demulsifier. The following mixture illustrates such a combination:

Epichlorinated derivative, for example, the product of Example 1c, 20%;

A cyclohexylamine salt of a polypropylated naphthalene monosulfonic acid, 24%;

An ammonium salt of a polypropylated naphthalene mono-sulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

The instant application is concerned with the use of derivatives of oxyalkylated resinous compounds for demulsification of petroleum emulsions of the water-in-oil type. It is obvious that the alicyclic analogues derived by nuclear hydrogenation are equally serviceable for this purpose, and particularly as intermediates for the manufacture of more complex compounds for use as demulsifying agents. In a general way, conversion of the aromatic material to an alicyclic material follows either one or two procedures: One can hydrogenate the resin in a conventional manner, followed by oxyalkylation of the hydrogenated resin in substantially the same manner as is employed in the case of the non-hydrogenated resin. The second procedure is to hydrogenate the oxyalkylated derivative rather than the resin itself. As an example of such procedure, reference is made to our co-pending applications Serial Nos. 64,443, filed December 8, 1948, and 74,474, filed February 3, 1949.

Having thus described our invention, what we claim as new and desire to secure by Letters Patent is:

1. A process for breaking petroleum emulsions of the water-in-oil type, characterized by subjecting the emulsion to the action of a demulsifier including a chloro-oxypropylated derivative of hydrophile hydroxylated synthetic products; said hydrophile synthetic products being oxyalkylation products of (A) An alpha-beta alkylene oxide having not more than 4 carbon atoms and selected from the class consisting of ethylene oxide, propylene oxide, butylene oxide, glycide, and methylglycide;

(B) An oxyalkylation-susceptible, fusible, organic solvent-soluble, water-insoluble, phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

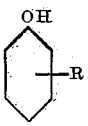

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; said chloro-oxypropylated compounds being obtained by reaction with epichlorohydrin; and with the final proviso that the hydrophile properties of the chloro-oxypropylated derivative as well as the oxyalkylated resin in an equal weight of xylene are sufficient to produce an emulsion when said xylene solution is shaken vigorously with one to three volumes of water.

2. A process for breaking petroleum emulsions of the water-in-oil type, characterized by subjecting the emulsion to the action of a demulsifier including a chloro-oxypropylated derivative of hydrophile hydroxylated synthetic products; said hydrophile synthetic products being oxyethylation products of an oxyethylation-susceptible, fusible, organic solvent-soluble, water-insoluble, phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

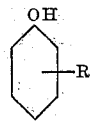

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(C_2H_4O)_n$, and $n$ is a numeral varying from 1 to 20; with the proviso that at least 2 moles of ethylene oxide be introduced for each phenolic nucleus; said chloro-oxypropylated compounds being obtained by reaction with epichlorohydrin; and with the further proviso that the hydrophile properties of the chloro-oxypropylated derivative, as well as the oxyethylated resin, in an equal weight of xylene are sufficient to produce an emulsion when said xylene solution is shaken vigorously with one to three volumes of water.

3. A process for breaking petroleum emulsions of the water-in-oil type, characterized by subjecting the emulsion to the action of a demulsifier including a chloro-oxypropylated derivative of hydrophile hydroxylated synthetic products; said hydrophile synthetic products being oxyethylation products of an oxyethylation-susceptible, fusible, organic solvent-soluble, water-insoluble, phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

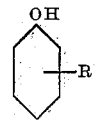

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(C_2H_4O)_n$, and $n$ is a numeral varying from 1 to 20; with the proviso that more than 4 moles of ethylene oxide be introduced for each phenolic nucleus; said chloro-oxypropylated compounds being obtained by reaction with epichlorhydrin; and with the further proviso that the hydrophile properties of the chloro-oxypropylated derivatives, as well as the oxyethylated resin, in an equal weight of xylene are sufficient to produce an emulsion when said xylene solution is shaken vigorously with one to three volumes of water.

4. A process for breaking petroleum emulsions of the water-in-oil type, characterized by subjecting the emulsion to the action of a demulsifier including a chloro-oxypropylated derivative of hydrophile hydroxylated synthetic products; said hydrophile synthetic products being oxyethylation products of an oxyethylation-susceptible, fusible, organic solvent-soluble, water-insoluble, phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

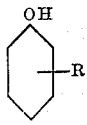

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(C_2H_4O)_n$, and $n$ is a numeral varying from 1 to 20; with the proviso that more than 4 moles of ethylene oxide be introduced for each phenolic nucleus; said chloro-oxypropylated compounds being obtained by reaction with epichlorhydrin on the equimolar basis of one mole of the epoxy compound for each phenolic hydroxyl originally present; and with the further proviso that the hydrophile properties of the chloro-oxypropylated derivative, as well as the oxyethylated resin, in an equal weight of xylene are sufficient to produce an emulsion when said xylene solution is shaken vigorously with one to three volumes of water.

5. A process for breaking petroleum emulsions of the water-in-oil type, characterized by subjecting the emulsion to the action of a demulsifier including a chloro-oxypropylated derivative of hydrophile hydroxylated synthetic products; said hydrophile synthetic products being oxyethylation products of an oxyethylation-susceptible, fusible, organic solvent-soluble, water-insoluble, phenolaldehyde resin; said resin being derived by reaction between a difunctional monohydric phenol and formaldehyde; said resin being formed in the substantial absence of trifunctional phenols; said phenol being of the formula:

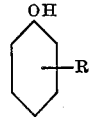

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(C_2H_4O)_n$; and $n$ is a numeral varying from 1 to 20; with the proviso that more than 4 moles of ethylene oxide be introduced for each phenolic nucleus; said chloro-oxypropylated compounds being obtained by reaction with epichlorhydrin on the equimolar basis of one mole of the epoxy compound for each phenolic hydroxyl originally present; and with the further proviso that the hydrophile properties of the chloro-oxypropylated derivative, as well as the oxyethylated resin, in an equal weight of xylene are sufficient to produce an emulsion when said xylene solution is shaken vigorously with one to three volumes of water.

6. The process of claim 5, wherein R is substituted in the para position.

7. The process of claim 5, wherein R is a butyl radical substituted in the para position.

8. The process of claim 5, wherein R is an amyl radical substituted in the para position.

9. The process of claim 5, wherein R is a nonyl radical substituted in the para position.

MELVIN DE GROOTE.
BERNHARD KEISER.

REFERENCES CITED

The following references are of record in the file of this patent:

UNITED STATES PATENTS

| Number | Name | Date |
|---|---|---|
| 2,397,058 | Moeller | Jan. 5, 1943 |
| 2,430,002 | De Groote et al. | Nov. 4, 1947 |
| 2,454,541 | Bock et al. | Nov. 23, 1948 |